United States Patent [19]

Engelmann

[11] 4,130,819

[45] Dec. 19, 1978

[54] OPTICAL CHARACTER RECOGNITION DEVICE

[75] Inventor: Rudolph H. Engelmann, St. Paul, Minn.

[73] Assignees: Hildegarde Seifried, North Hollywood, Calif.; John W. Adams, Minneapolis, Minn.

[21] Appl. No.: 808,912

[22] Filed: Jun. 22, 1977

[51] Int. Cl.² .............................................. G06K 9/12
[52] U.S. Cl. ......................................... 340/146.3 AC
[58] Field of Search .......... 340/146.3 AC, 146.3 MA, 340/146.3 J, 146.3 Y, 146.3 AE

[56] References Cited

U.S. PATENT DOCUMENTS

| | | | |
|---|---|---|---|
| 3,346,845 | 10/1967 | Fomenko | 340/146.3 Y |
| 3,873,972 | 3/1975 | Levine | 340/146.3 AC |
| 3,999,161 | 12/1976 | Van Bilzem et al. | 340/146.3 AC |

*Primary Examiner*—Leo H. Boudreau
*Attorney, Agent, or Firm*—John W. Adams

[57] ABSTRACT

An optical character recognition device including means to define a scanning area which includes portions of a printed character to be scanned by a television camera, said camera scanning discrete points of said area arranged in spaced vertical paths, and including means to measure the optical density of the character portion encountered at each point and to assign a binary-coded numerical value to each point and to store each of said numerical values in a matrix-like fashion corresponding to the respective point's position in said scanning area. Electronic circuitry is also provided to derive a plurality of identifying characteristics from said numerical values which uniquely describe the scanned character, said identifying characteristics then being compared to the identifying characteristics of a predetermined number of reference characters by application of predetermined comparison criteria to determine which reference character is the closest match to the scanned character, said closest reference character is then outputted, and means are also provided for modifying the identifying characteristics of said reference characters to compensate for type irregularities and typing ribbon wear.

32 Claims, 27 Drawing Figures

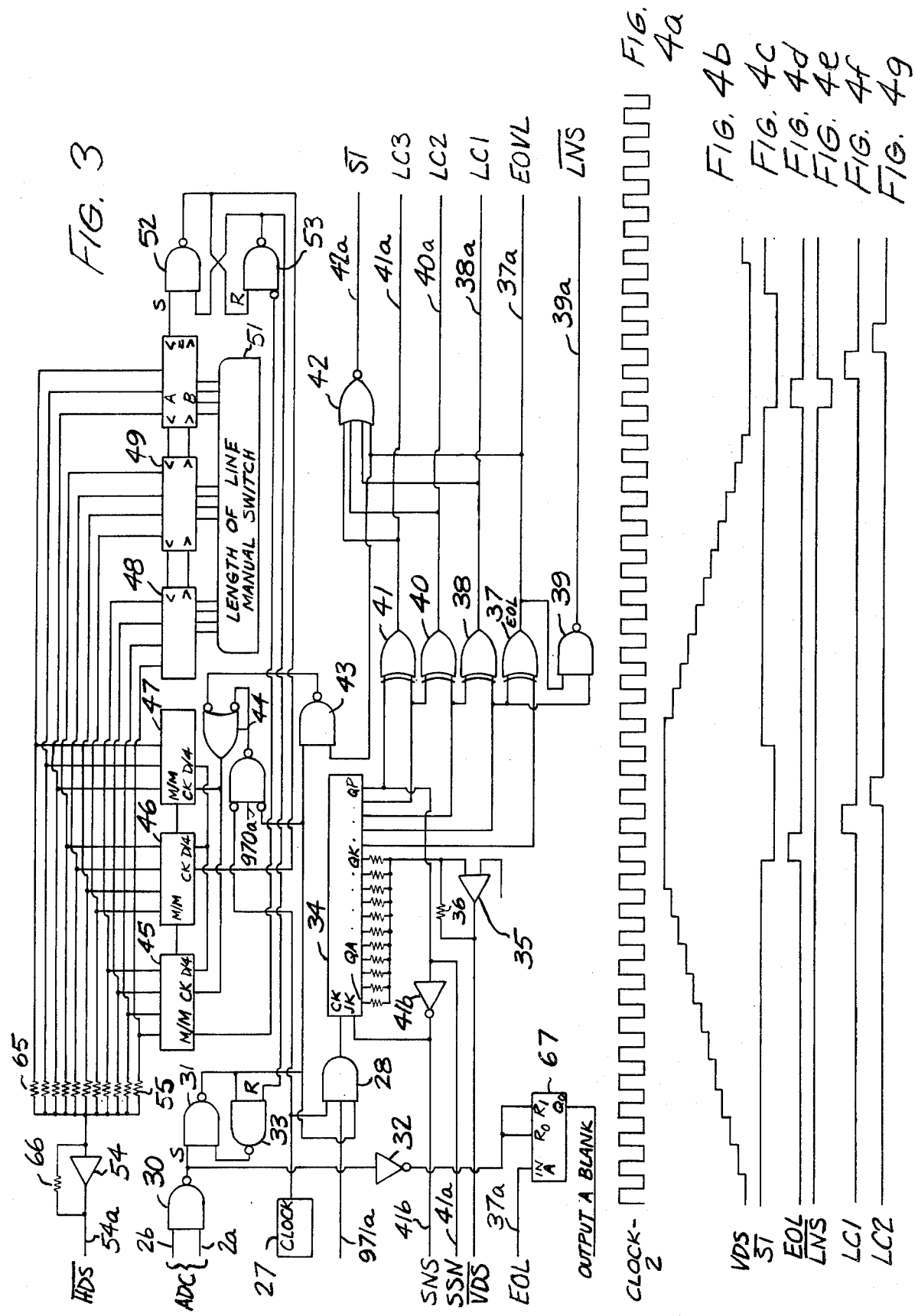

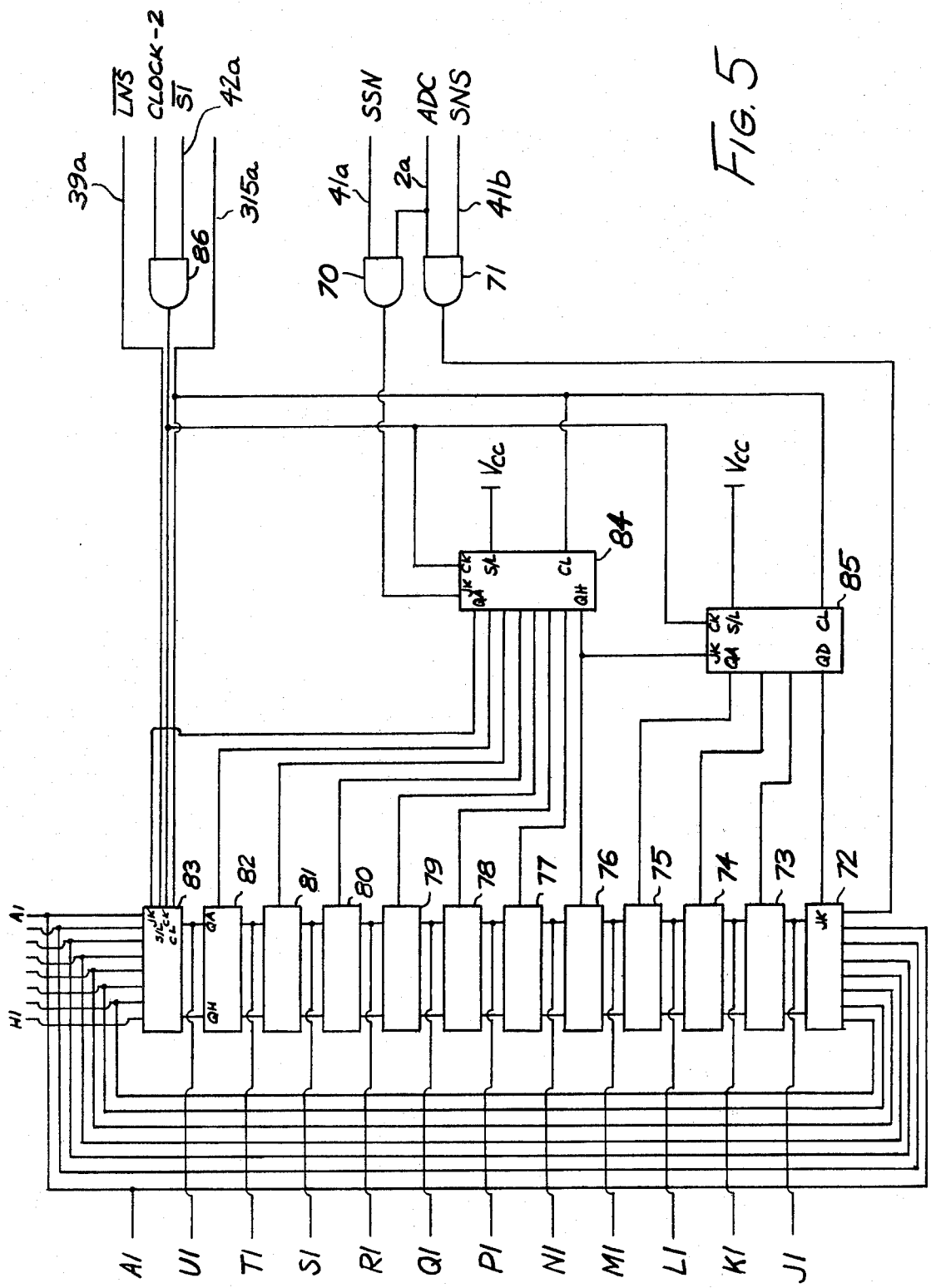

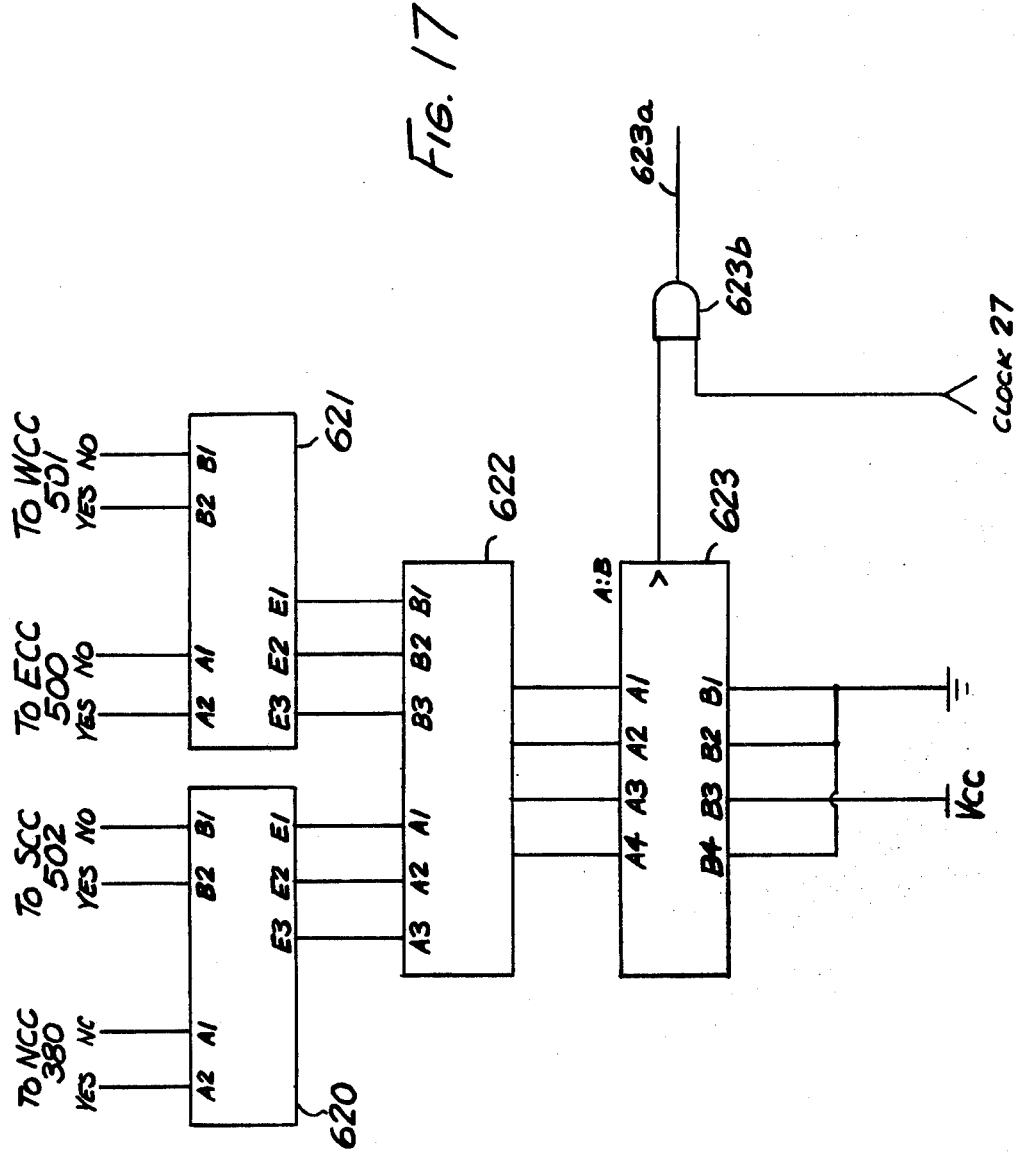

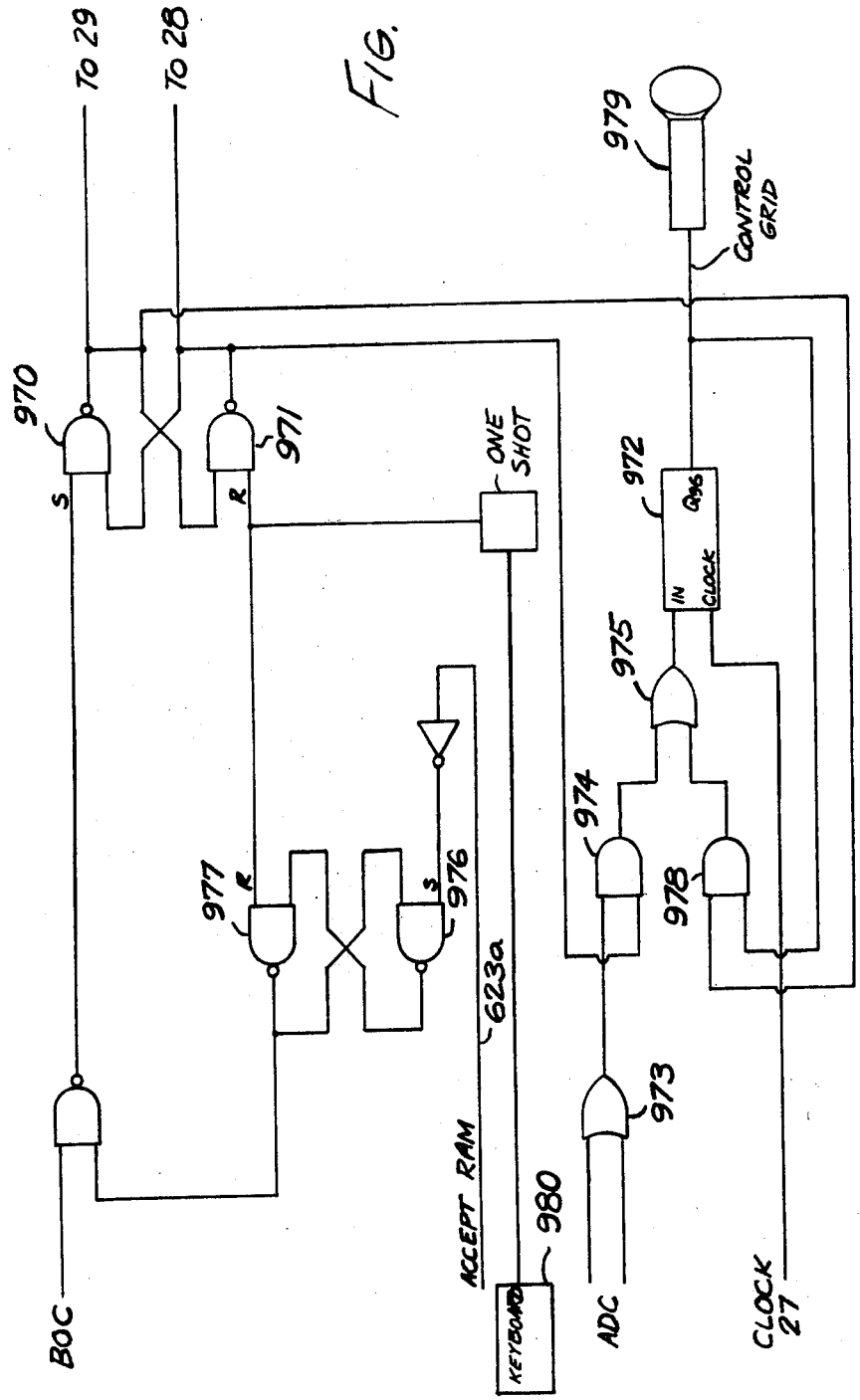

OPTICAL CHARACTER RECOGNITION DEVICE

BACKGROUND AND SUMMARY OF THE INVENTION

A great deal of research and development money has been spent by the electronic industry to produce a satisfactory optical character recognition device which is capable of identifying the characters produced in conventional printing styles, thus eliminating the requirement that the characters be specifically malformed in order to permit electronic recognition thereof either by magnetic ink and sensing devices or by optical sensing and identification circuitry. Such systems are commonly in use by banks for identifying preprinted checking account numbers and by other industries for rapidly handling preprinted and coded items, such as coupons, labels and the like. In addition to such limited use of equipment, there are a number of OCR devices which purport to read conventional printed characters, but do so at only relatively slow speeds and with considerable inaccuracy, and in a manner entirely different from the manner embodied in this invention.

This invention embodies the use of a television camera scanning unit which permits successive scanning of the characters to be identified and permits the sensing of the identifying characteristics required for accurate and positive identification at extremely high speeds on the order of 66,000 characters per second, as compared with devices presently on the market operating at between 500 and 3,000 characters per second. Further, this invention is more compact and inexpensive than other OCR machines presently on the market.

The high speed capabilities of this invention are attributable to the asynchronous design of the logic circuitry and to the manner of storage of the scanned character identifying characteristics which enables the television camera to continuously scan the input material without having to stop after every character, as is the requirement of some OCR machines.

Other advantages of this invention include the capability of accurately recognizing characters which are too large to totally fit into the scanning area and the capability of automatically correcting any mispositioning of the scanned character in the scanning area.

BRIEF DESCRIPTION OF THE DRAWINGS

FIG. 3 is a circuit diagram for the control unit designated Control 600 circuit in FIGS. 1a and 1b.

FIGS. 4a through 4g constitute the timing bar charts showing the signals produced by the control unit shown in FIG. 2.

FIG. 5 is a circuit diagram showing a portion of the character image register CIR 3 shown in FIGS. 1a and 1b.

FIG. 7 is a circuit diagram for the east character segment detector ECSD 5, the east character line total circuit ECLT 9 and the multiplier 10 shown in FIG. 1a.

FIG. 14 is a circuit diagram showing the circuitry for the east contour value circuit ECVC 710 shown in FIG. 1a.

FIG. 17 is a circuit diagram showing the rest of the circuitry for judgment circuitry JC 650.

FIG. 18 is a circuit diagram showing the circuitry to enable the operator to compensate for type irregularities and ribbon wear.

Figure 1A:
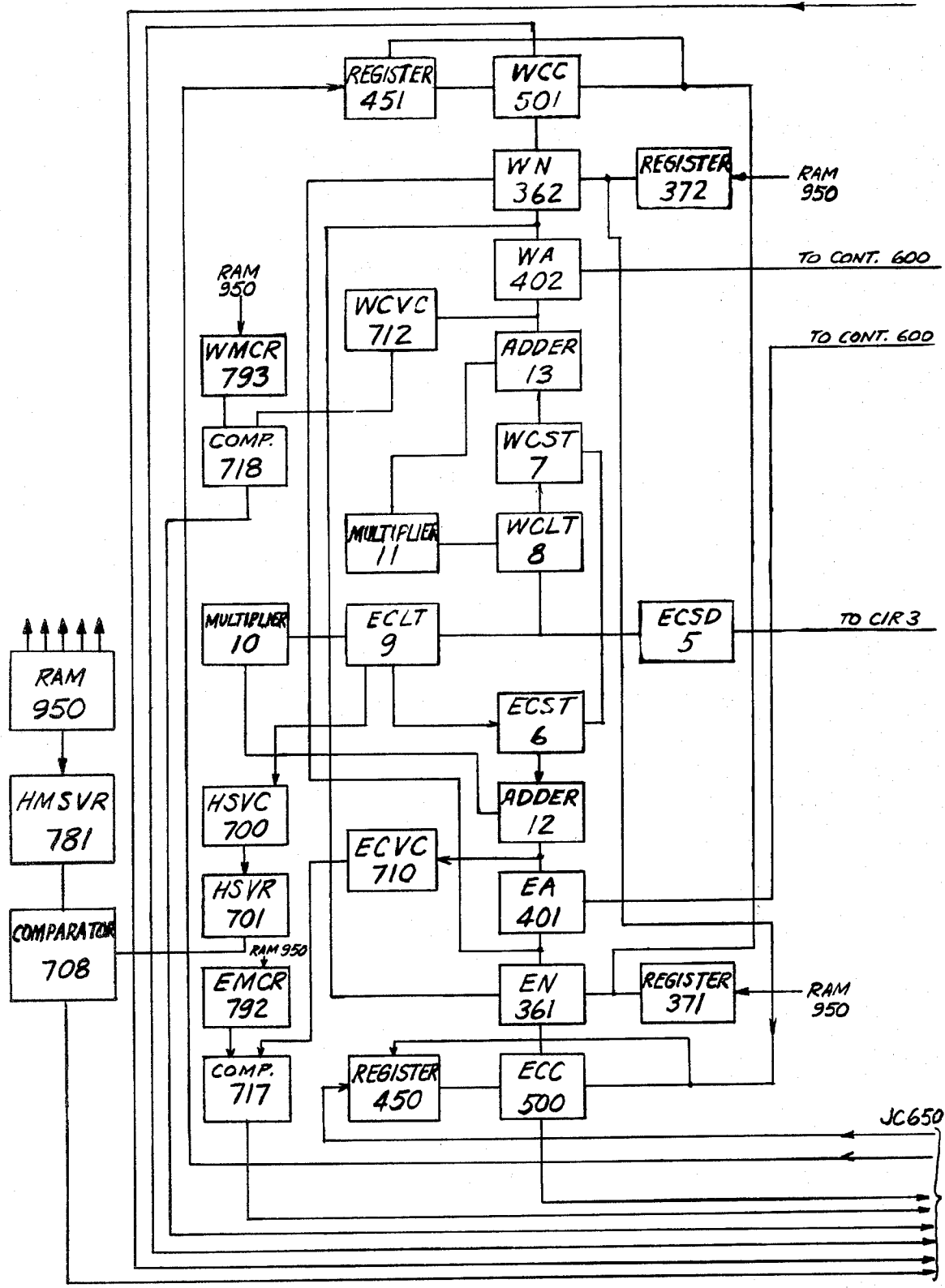
FIGS. 1a and 1b combined provide a block diagram of the general circuitry embodying this invention.
Figure 1B:
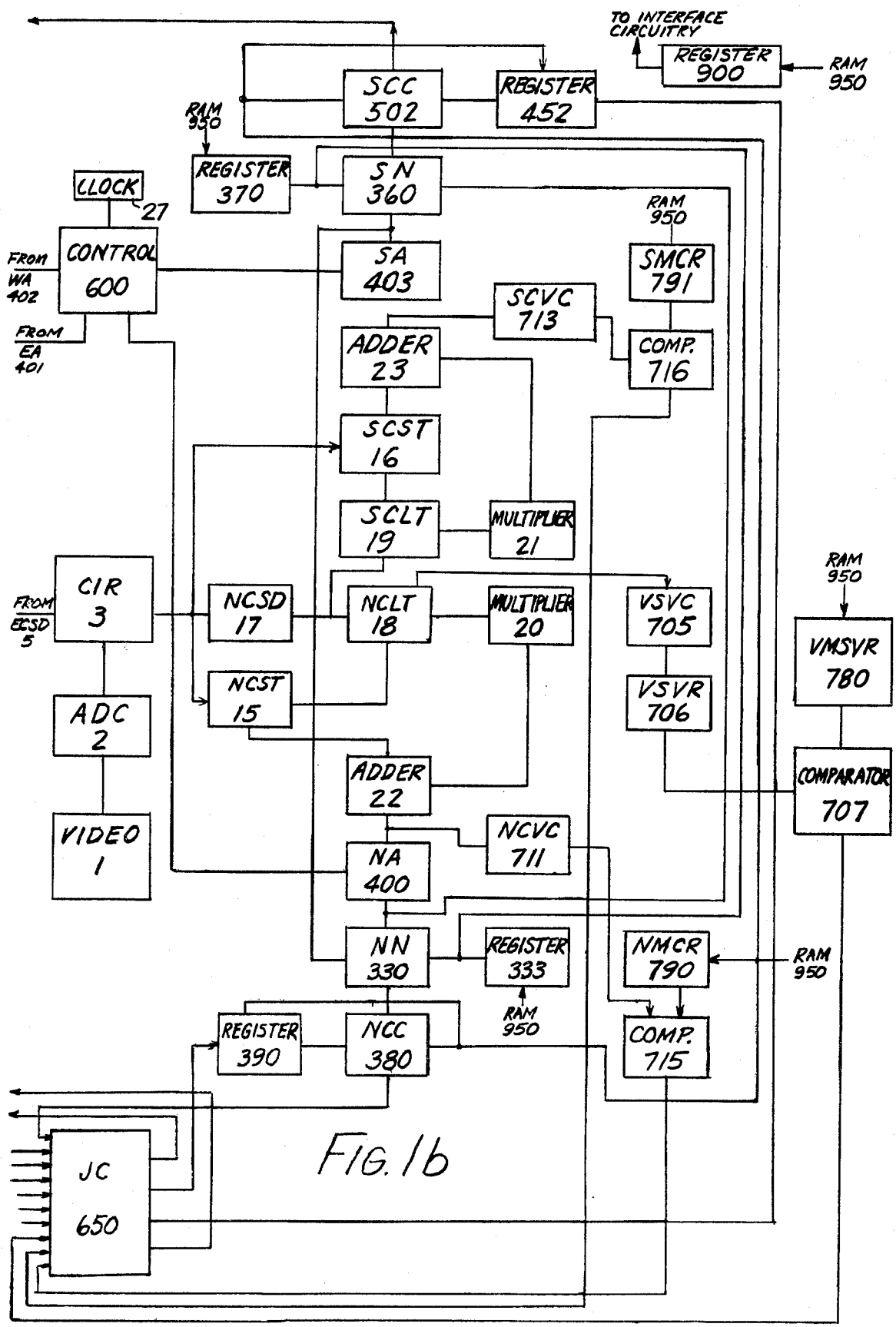
Figures 2A, 2B:
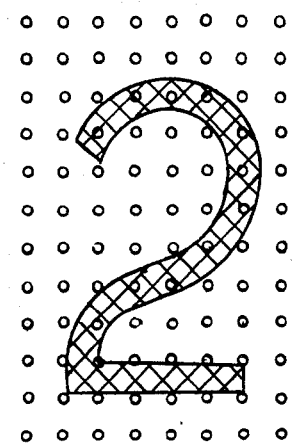
FIG. 2a is a representation of the character "2" and where typically the scanning points would be located thereupon.
FIG. 2b is a pictorial representation of the binary values of the typical optical densities corresponding to each scanning point of FIG. 2a, said values being arranged in a matrix-like fashion analogous to their storage positions in CIR 3.

DETAILED DESCRIPTION OF THE PREFERRED EMBODIMENTS (1) General Description of Operation In FIGS. 1a and 1b, a conventional video scanner 1 scans input material along laterally spaced vertical paths. The scanning process is momentarily stopped between paths, this time being sufficient (as further described later) to allow the below described identification process to take place. Each scanning path is broken down in this embodiment into twelve uniformly spaced scanning points, as shown in FIG. 2a.

Signals corresponding to each of said scanning points are transmitted to an analog to digital converter ADC 2 whereby said analog signals are converted into three digit binary signals which are then stored in individual scanning point positions in a character image register CIR 3. FIG. 2b is a representation of the contents of the scanning point positions of CIR 3 after the character "2" of FIG. 2a is completely scanned by this invention.

East character segment detector ECSD 5 produces signals for each horizontal line of said scanning point signals held in CIR 3, said signals relating to whether or not input material (e.g. dark material on an otherwise light background) was encountered at each scanning point. For example, for the third top horizontal line of FIG. 2b, ECSD 5 produces signals showing input material was encountered at the fourth, fifth, sixth and seventh scanning points (going from left to right), and that no input material was encountered at the first, second, third and eighth scanning points.

The signals from ECSD 5 are transmitted to both the east character line total circuit ECLT 9 and to the west character line total circuit WCLT 8. For each horizontal line of scanning point signals contained in CIR 3, ECLT 9 samples the scanning point positions contained in said line starting from the left most (east) point contained in said horizontal line until it perceives a dark to light transition point (that is, until it encounters a scanning point position adjacent to the right of a scanning point position containing at least the binary representation of one is found to contain all zeros). ECLT 9 determines the number of scanning point positions prior to the said dark to light transition point (which will be defined at the east transition point) and transmits this number to a multiplier 10 wich multiplies said number by a factor of seven.

West character line total circuitry WCLT 8 determines the number of scanning point positions going from right to left (west) in the horizontal line of CIR 3 that ECLT 9 is simultaneously operating upon before a dark to light transition point (defined to be the west transition point) is encountered. This last mentioned number of scanning point positions is then transmitted to multiplier 11 which multiplies the number of a factor of seven. For example, the number of scanning points in the third top horizontal line of FIG. 2b before the east transition point is seven, while there are five scanning point positions before the west transition point.

East character segment total circuitry ECST 6 sums the binary representations of each scanning point position prior to the east transition point detected by ECLT 9. For example, in the third top horizontal line, the sum is 25 (i.e. 111 + 111 + 111 + 100). Adder 12 subsequently substracts this number from twice the number outputted by multiplier 10 (which in our example is 2 × 7 × 7, or 98). In our example adder 12, therefore, subtracts 25 from 98, which results in 74. This resultant number is the east penetration value for the third top horizontal line of CIR 3, and is accumulated with all other east penetration values of the character being scanned in east accumulator EA 401. A similar operation is performed by west character segment detector circuitry WCST 7 and adder 13, the resultant number, or west penetration value (in our example equal to 70 − 25, or 45) being accumulated with all other west penetration values of the character being scanned in west accumulator WA 402.

North character segment detector (NCSD) 17 performs a function on each vertical line of scanning point positions in CIR 3 which is analogous to the functioning of ECSD 5 on each vertical line of CIR 3. The output of an NCSD 17 is transmitted both to the north character line total circuitry NCLT 18 and to a south character line total circuitry SCLT 19. NCLT 18 determines the number of point positions in each vertical line starting at the top (north) of each line before a dark to light transition point (north transition point) is encountered on each vertical line of CIR 3. SCLT 19 determines the number of scanning point positions on the same vertical line NCLT 18 is simultaneously operating on before a dark to light transition point (south transition point) is encountered, starting at the bottom (south) of said vertical line being operated upon. The number of scanning point positions prior to the north transition point determined by NCLT 18 (for example, for the third from left vertical line this number is 5) is multiplied by a factor of seven by multiplier 20. The number of scanning point positions in each vertical line of CIR 3 prior to the south transition point determined by SCLT 19 (in our example, four points precede the south transition point) is also multiplied by a factor of seven by multiplier 21. North character segment total circuitry NCST 15 sums the binary representations of each of the scanning points comprising the vertical line before north transition (in our example, the sum would be 9) and transmits them to an adder 22 where said sum is subtracted from twice the quantity contained in multiplier 20. (In our example this would be 70 − 9 equals 61). This resultant quantity (i.e. 61) is the north penetration value for that vertical line, and is accumulated with all other north penetration values for the character being scanned in north accumulator NA 400. A south character segment total circuitry SCST 16 sums the binary representation of each scanning point contained in a vertical line of CIR 3 prior to said south transition point. In our example, this sum is 14. This sum is subtracted from twice the quantity in multiplier 21 by adder 23. (In our example, this would be 56 − 4 equals 42). This resultant quantity is the south penetration value for that vertical line, and is accumulated with all other south penetration values of the character being scanned in south accumulator SA 403.

These four accumulated north, south, east and west penetration values are four identifying characteristics of the scanned character. Two other identifying characteristics are the horizontal (or east-west) and vertical (or north-south) style values.

Horizontal style value circuit HSVC 700 counts each dark to light transition point of every horizontal line of CIR 3, and transmits the highest total transition points contained in a single horizontal line, called the horizontal style value HSV, to horizontal style value register HSVR 701. Vertical style value circuit VSVC 705 counts each dark to light transition point occurring in every vertical line in CIR 3, and transmits the highest number of said points contained in a single vertical line, called the vertical style value VSV, to vertical style value register VSVR 706.

The last four identifying characteristics are the north, south, east and west contour values. The contour value for the number "2" in FIG. 2a is derived in the following manner. East contour value circuit ECVC 710 compares each east penetration value with the succeeding value, going from top to bottom of CIR 3. If the succeeding value is less than the prior value (by an arbitrary amount), that succeeding value will be saved as the prior value, and will then be compared with another succeeding value. If the succeeding value is less than the prior value, the succeeding value again will be saved as the prior value. However, if the succeeding value is greater than the prior value (by an arbitrary amount to compensate for printing and darkness variations), a counter will be incremented by one and the succeeding value is saved as the prior value. This process continues until all east penetration values have been compared. In our example, the east contour value will be 2, the west contour value will be 2, the north contour value will be 1, and the south contour value will also be 1. The north, west and south contour values are derived by north, west and south contour value circuits 711, 712 and 713 respectively, and are stored therein.

Initially, before the scanned material can be correctly identified, an education cycle must be completed. This comprises scanning the characters in the particular type font to be used in the following material, deriving the accumulated penetration values, the four contour values and the two style values for each character as described above and then writing this information for each character in that type font into conventional memory device, which is a conventional RAM-type (random access memory) device 950 in this particular embodiment.

The first north, south, east and west memory penetration values contained in RAM 950 are loaded into memory registers 370, 333, 372 and 371 respectively. The east accumulated penetration value EAPV contained in east accumulator 401 is then normalized in east normalizer EN 361. This normalization process comprises deriving the difference between the west accumulated penetration value WAPV contained in west accumulator 402 and the west memory penetration value WAPV contained in west accumulator 402 and the west memory penetration value WMPV contained in register 371, respectively and adding algebraically this difference to the EAPV contained in east accumulator 401. The normalization process carried out in west normalizer WN 362 is analogous to that of east normalizer EN 361 in that the difference between the EAPV in east accumulator 401 is subtracted from the east memory penetration value EMPV contained in register 372, and the difference added algebraically to WAPV contained in west normalizer WN 402. Similar normalization processes are done by north normalizer NN 330 and south normalizer SN 360.

The east normalized accumulated penetration value ENAPV contained in east normalizer EN 361 is transmitted to east comparison circuitry ECC 500. ECC 500 adds the value of EMPV contained in register 372 to the east candidate accumulated penetration value ECAPV contained in the east candidate register 450, which is in this intial comparison equal to zero. The average of the values contained in registers 372 and 450 is then compared to ENAPV. The ENAPV will be either greater than, equal to or less than the average of EMPV and ECAPV.

If said ENAPV is less than said average of EMPV and ECAPV and EMPV is smaller than ECAPV, EMPV is further compared with ENAPV. If this comparison falls within an arbitrary tolerance limit, in this embodiment equal to 6.25%, a "yes" signal will be derived and transmitted to judgment circuitry 650. If ENAPV is greater than said average and EMPV is larger than ECAPV, ENAPV will be further compared with EMPV. If this comparison falls within the arbitrary tolerance, in this embodiment equal to 6.25%, a "yes" signal will also be generated and transmitted to judgment circuitry 650. If the normalized value and the average value are equal to each or EMPV is equal to ECAPV, a "no decision" signal will be generated and transmitted to judgment circuitry 650. If, in the first two circumstances described immediately above, the value contained in either register 372 or register 450 does not fall within the arbitrary tolerance limit set or if EMPV and ENAPV do not have identical greater than or less than relationships to said average, no signal will be transmitted to the judgment circuitry 650. Similar processes are carried out by the west comparison circuitry WCC 501, south comparison circuitry SCC 502, and north comparison circuitry NCC 380, and the resultant "yes" and "no decision" signals are also transmitted to judgment circuitry 650.

Simultaneously with the loading of the NMPV, SMPV, EMPV and WMPV, the vertical and horizontal memory style values VMSV and HMSV corresponding to the loaded memory penetration values are loaded into vertical and horizontal memory style value registers VMSVR and HMSVR 780 and 781 respectively. Also simultaneously with the loading of the VMSV and HMSV, the north, south, east and west memory contour values NMCV, SMCV, EMCV and WMCV, corresponding to the loaded memory style values, are loaded into memory contour registers 790, 791, 792 and 793 respectively.

The VMSV in register 780 is compared with the VSV in register 706 by vertical style value comparator 707, and the HMSV in register 781 is compared with the HSV in register 701 by horizontal style value comparator 708.

The NMCV is compared with the NCV by comparator 715, the SMCV is compared with the SCV by comparator 716, the EMCV is compared with the ECV by comparator 717, and the WMCV is compared with the WCV by comparator 718, and the results are transmitted to judgment circuitry 650.

Judgment circuitry 650 decides whether or not the values contained in memory registers 370, 372, 371 and 333 are a better "fit" for the normalized value of the unknown character being scanned than the value contained in candidate registers 390, 450, 451 and 452. Said judgment circuitry 650 gives a value of "2" to each "yes" signal received, and a value of "1" for each "no decision" signal received. Said circuitry 650 then sums the values of the signals received, and will gate the values contained in registers 370, 371, 372 and 33 into candidate registers 390, 451, 450 and 452 if the sum of such signals is greater than four, and if at least three out of the four memory contour values are equal to their corresponding unknown character contour values (e.g. if NMCV equals NCV, SMCV equals SCV and EMCV equals ECV). If the sum is less than or equal to four or if two or more of the memory contour values do not equal their corresponding contour values, or if NSV and ESV do not equal NMSV and EMSV respectively, the values contained in said candidate registers remains the same. The four accumulated penetration values corresponding to the next character contained in RAM 950 are then clocked into registers 371, 372, 370 and 333 and the corresponding contour values and style values contained in said RAM 950 are clocked into registers 790, 791, 792 and 793 and 780 and 781.

The normalization and comparison process described above will then be performed again, with either the values of said memory registers being clocked into said candidate registers if the values in said registers are a better "fit" to the unknown value, or with the contents of said candidate registers being unchanged if the values contained in said candidate registers are a better "fit" to the normalized values of the unknown character scanned. This normalized and comparison process continues until all of the values contained in said conventional memory have been compared to the normalized values of said unknown character.

Address register 900 contains the RAM 950 address corresponding to the character values contained in said candidate registers, the address changing every time the value of a new character are clocked into said candidate registers. After all the characters in RAM have been compared with the unknown character, register 900 contains the address of the "best fit" character, said address being the conventional character identification code for the "best fit" character.

If, after all the character information contained in RAM is compared with the unknown character information, register 900 contains zero, which means that no character contained in RAM was an acceptable fit, control circuitry 600 disables the scanning sweep and the unknown character is displayed by conventional video means. The operator must then visually determine the identity of the unknown character. In this invention, when the operator has determined the identity, control circuitry 600 enables the operator to address RAM 950 to the identified character position, place RAM 950 in write mode, and write the information contained in the four candidate registers, the four contour value circuits and the two style value registers into RAM. The scanning sweep is again enabled. This procedure allows the operator to easily correct for gradual deterioration in the image quality of a character due to wear of the typewriter ribbon, or ink supply, or due to the wear of the type, among other factors.

(2) Control Circuitry

In FIG. 3, control circuitry 600 is shown. A clock 27 is connected to an input of an AND 28 and to an input of AND 29. Another input of AND 28 is connected to terminal 971a, while another input of AND 29 is connected to terminal 970a. Outputs 2a and 2b of ADC 2 (FIG. 1) are connected to the inputs of NAND 30. The output of NAND 30 is connected to an input NAND 31 and to the input of inverter 32. The output of inverter 32 is connected to the reset inputs of counter 67. The output of NAND 31 is connected to an input of NAND 33 and to the other input of AND 28. The output of NAND 33 is connected to the other input of NAND 31 to comprise a set-reset flip-flop circuit. The output of AND 28 is connected to the clock of a sixteen-bit shift register 34. The first eleven outputs $Q_A$ through $Q_K$ inclusive of register 34 are fed respectively numbered 34a through 34k through registers as current inputs to a summing point forming the inverting input of operational amplifier 35. A resistor 36 connects the input of amplifier 35 to the output of said amplifier 35 to complete a negative feedback loop. Output $Q_L$ of register 34 is connected to an input of exclusive OR 37, while output $Q_M$ of register 34 is connected to the other input of exclusive OR 37, and also to an input of exclusive OR 38 and NAND 39. Output $Q_N$ of register 34 is connected to both the other input of exclusive OR 38 and to an input of exclusive OR 40. Output $Q_O$ of register 34 is connected both to the other input of exclusive OR 40 and to an input of exclusive OR 41. Output $Q_P$ of register 34 is connected both to the other input of exclusive OR 41 and to the input of inverter 41b. The input of inverter 41 is also connected to terminal 41a, while the output of said inverter 41 is connected to the JK input of register 34 and to terminal 41b.

The outputs of exclusive ORs 37, 38, 40 and 41 are connected to the inputs of NOR 42. The outputs of said exclusive ORs 37, 38, 40 and 41 are also respectively connected to terminals 37a, 38a, 40a and 41a. The other input of NAND 39 and an input of NAND 43 are also connected to the output of exclusive OR 37. The outputs of NANDs 39 and 43 are respectively connected to terminal 39a and an inverting input of OR 44. The other inverting input of OR 44 is connected to the output of NAND 29, while the other input of NAND 29 and NAND 43 are connected to the output of NAND 31. The output of OR 44 is connected to the clocks inputs of up-down counters 45, 46 and 47 which are cascade connected.

Three comparators 48, 49 and 50 are cascade connected and have four inputs each connected to a suitable bank of switches 51. The "less than" output of comparator 50 is connected to the set input of set-reset flip-flop circuit formed by NAND 52 and NAND 53. The carry output of counter 45 is fed to the inverted reset input to NAND 53 while the output of NAND 53 is connected to the reset input to NAND 33. The output of NAND 52 is connected to the up-down inputs of counters 45, 46 and 47.

The first output of counter 45 and a first input of comparator 48 are connected together and are subsequently fed through R55 to form a current input to a summing point forming the inverting input to operational amplifier 54. The second output of said counter 45 is connected to a second input of comparator 48 and subsequently fed through R56 to form a second current input to the inverting input to operational amplifier 54. In a similar manner the third and fourth outputs of inputs, respectively counter 45 and comparator 48, are connected together and subsequently connected by resistors 57 and 58 respectively to said imput of operational amplifier 54. The first, second, third and fourth outputs of counter 46 and first, second, third and fourth inputs of 49 are respectively connected together and are subsequently connected to said amplifier by resistors 59, 60, 61 and 62 respectively. The first, second and third outputs of counter 47 and first, second and third inputs of comparator 50 are respectively connected together and are subsequently connected to said amplifier 54 by resistors 63, 64 and 65 respectively. A resistor 66 is connected between the output and input of amplifier 54 to complete a negative feedback loop. The output of amplifier 54 is connected to terminal 54a.

FIGS. 4a–4g show typical waveforms produced by the control circuitry of FIG. 3. FIG. 4a is the CLOCK 2 signal produced by clock 22. FIG. 4b is the VDS signal which is derived from output 35b of operational amplifier. FIG. 4c shows the $\overline{S1}$ signal from output 42a of OR 42. The EOL signal shown in FIG. 4d appears at output 37a of OR 37. FIG. 4e is the $\overline{LNS}$ signal from output 39a of NAND 39; FIG. 4f is the LC1 signal from output 38a of OR 38; and FIG. 4g is the LC2 signal from output 40a of OR 40.

(3) Character Image Register (CIR)

In FIG. 5, the circuitry of the CIR 3 corresponding to one output bit 2a of ADC is shown. The circuitry of CIR corresponding to the other two bits outputs, 2b and 2c, of ADC is identical to that of output 2a.

Output 2a of ADC 2 is connected to an input of both AND 70 and 71. The other input of AND is connected to terminal 41a of the control circuitry to receive the SSN signal while the other input of AND 71 is connected to termianl 41b. The output of AND 71 is connected to the first parallel input of register 72. Shift registers 72 through 83 inclusive are connected in stacked relation, as shown, with each of the outputs of a register connected to the corresponding parallel input of the succeeding register, except that the first through seventh outputs of register 83 are connected to the second through parallel inputs of register 72.

The output of AND 70 is connected to the serial input of register 84. The first through eighth outputs of said register 84 are connected to the serial inputs of registers 83, 82, 81, 80, 79, 78, 77 and 76 respectively. The eighth output of register 84 is connected to the serial input of register 85. The first four outputs of said register 85 are connected to the serial inputs of registers 75, 74, 73 and 72 respectively.

Terminal 39a (of the control circuitry) provides the LNS signal to the S/L input of each of registers 72 through 82, inclusive, while the S/L inputs of registers 84 and 85 are tied to a positive voltage source. Clock 27 and terminal 42a (of the control circuitry) provide the CLOCK 2 and $\overline{S1}$ signals, respectively, to the inputs of AND 86, the output of which is in turn connected to the clock input of each of registers 72 through 85 inclusive. The clear inputs of registers 72 through 85 inclusive are connected to terminal 315a.

As shown in FIG. 5, the first through eighth outputs of register 83 are labeled A1, B1, C1, D1, E1, F1, G1 and H1 respectively. The first inputs of registers 72 through 83 are labeled J1, K1, L1, M1, N1, P1, Q1, R1, S1, T1, U1 and A1 respectively.

In regard to the circuitry of CIR 3 corresponding to output 2b of converter 2, output 2b corresponds to output 2a, the first through eighth outputs of the register corresponding to register 83 are labeled A2, B2, C2, D2, E2, F2, G2 and H2 respectively, while the first outputs of the registers corresponding to registers 72 through 83 are labeled J2, K2, L2, M2, N2, P2, R2, S2, T2, U2 and A2. In regard to the circuitry of CIR corresponding to output 2c of converter 2, output 2c corresponds to output 2a, the first through eighth outputs of the register corresponding to register 83 are labeled A4, B4, C4, D4, E4, F4, G4, and H4 respectively, while the first outputs of the registers corresponding to registers 72 through 83 are labeled J4, K4, L4, M4, N4, P4, Q4, R4, S4, T4, U4 and A4 respectively.

Figure 6:
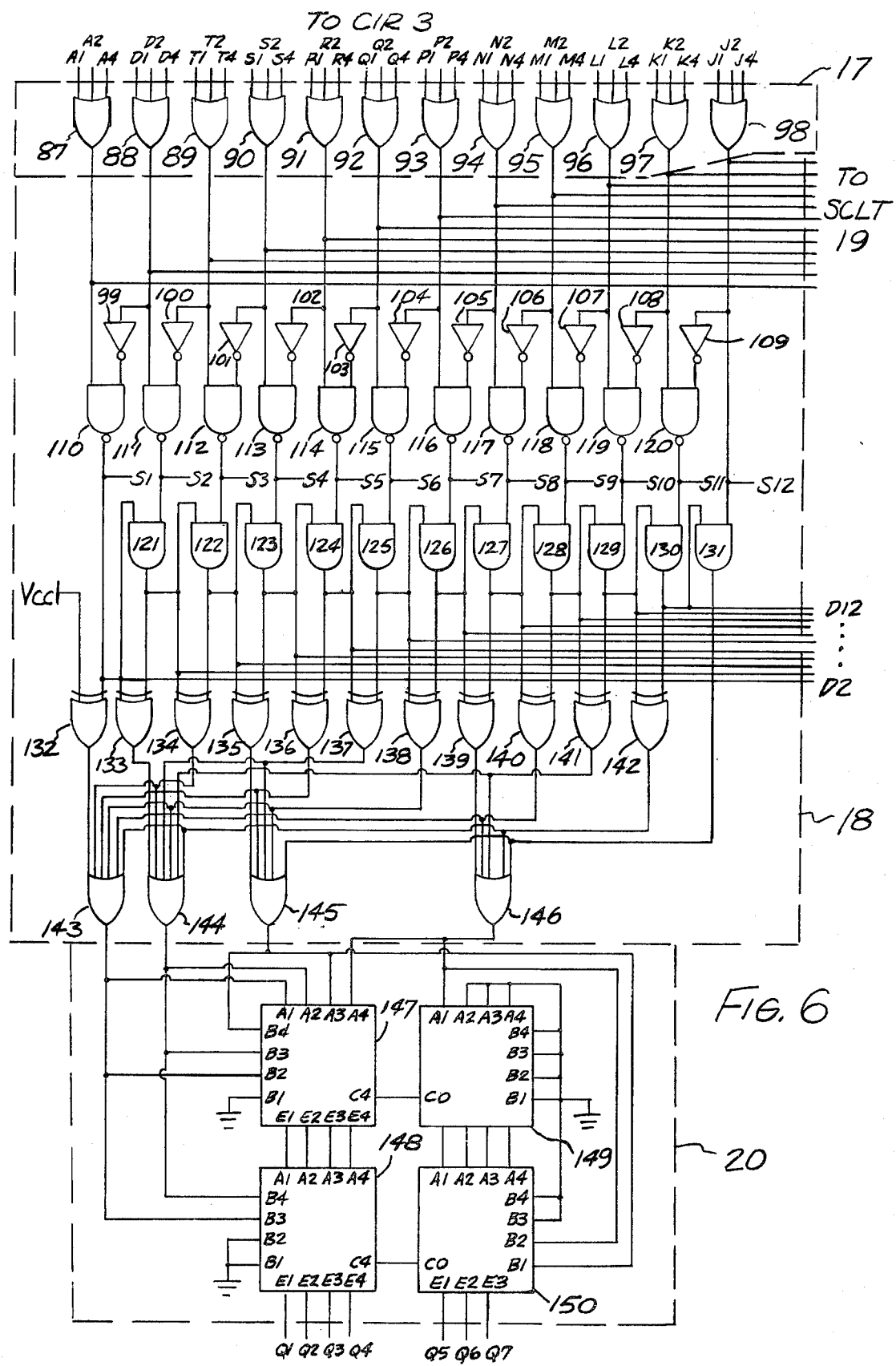
FIG. 6 is a circuit diagram for the north character segment detector NCSD 17, the north character line total circuit NCLT 18 and the multiplier 20 shown in FIG. 1b.

(4) North Character Segment Detector, North Character Line Total, and Multiplier Circuitry FIG. 6 is a schematic diagram of the circuitry for the north character segment detector NCSD 17, north character line total circuit NCLT 18 and multiplier 20.

The outputs J1, J2 and Jr of CIR 3 are connected to the inputs of OR 98. Outputs K1, K2 and K4 of CIR 3 are connected to the inputs of OR 97. In a similar manner, the outputs L1, L2, L4 and M1, M2, M4 and N1, N2, N4 and P1, P2, P4 and Q1, Q2, Q4 and R1, R2, R4 and S1, S2, S4 and T1, T2, T4 and U1, U2, U4 and A1, A2, A4 of CIR 3 are respectively connected to the inputs of ORs 96, 95, 94, 93, 92, 91, 90, 89, 88 and 87 respectively.

The outputs of ORs 87 through 98 are connected respectively to an input of NANDS 110 through 120, inclusive, and are also respectively connected to the inputs of inverters 99 through 109 inclusive. The outputs of inverters 99 through 109 inclusive are respectively connected to the other inputs of NANDS 110 through 120 inclusive.

The outputs of NANDS 111 through 120 inclusive are respectively connected to an input of ANDS 121 through 131, while the outputs of ANDS 121 through 130 inclusive are respectively connected to the other inputs of ANDs 122 through 131 respectively. The output of NANDs 110 is connected to both the other input of AND 121 and to an input of exclusive OR 132 and 133, while the output of OR 98 is connected to an input of AND 131.

The outputs of ANDs 121 through 129 inclusive are respectively connected to an input of exclusive ORs 134 through 142 inclusive, while the outputs of ANDs 121 through 130 inclusive are respectively connected to the other input of exclusive ORs 133 through 142 inclusive. The other input of exclusive OR 132 is connected to a positive level fixed voltage source.

The outputs of exclusive ORs 132, 134, 136, 138, 140 and 142 are respectively connected to an input of OR 143, while the output of exclusive ORs 133, 134, 137, 138 and 142 are respectively connected to an input of OR 144. The outputs of exclusive ORs 135, 136, 137, 138 and 131 are connected to the inputs of OR 145, while the outputs of exclusive ORs 139, 140, 141, 142 and 131 are connected to the inputs of OR 146.

The output of OR 143 is connected to inputs A1, and B2 of adder 147 and input B3 of adder 148. The output of OR 144 is connected to inputs A2 and B3 of adder 147 and input B4 of adder 148. The output of OR 145 is connected to inputs A3 and B4 of adder 147, and input B1 of adder 150. The output of OR 146 is connected to the input A4 of adder 147, the input A1 of adder 149 and input B2 of adder 150. The four outputs of S1 through S4 of adders 147 and 149 are respectively connected to the four inputs A1 through A4 of adders 148 and 150.

The circuitry of the SCLT 19 and multiplier 21 is identical to the circuitry for NCLT 18 and multiplier 20, but the outputs of ORs 87 through 98 inclusive are connected in reverse order to the NANDs of SCLT 19 corresponding to NANDs 110 through 120 of NCLT 18. That is, the output of OR 87 would be connected to the input of the NAND corresponding to NAND 120, etc.

Figure 7:
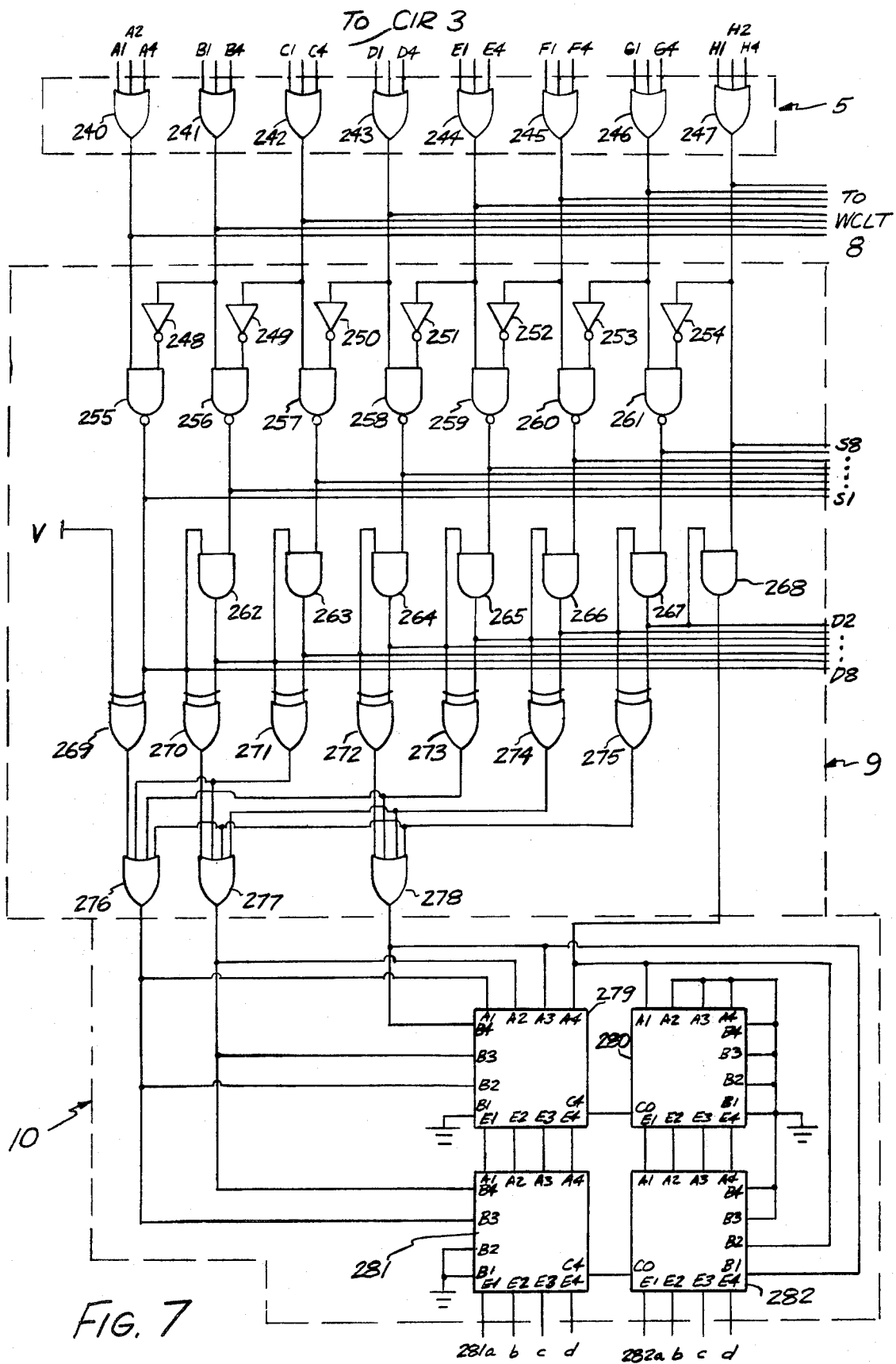

(5) East Character Segment Detector, East Character Line Total and Multiplier Circuitry The circuitry for the ECSD 5, ECLT 9 and multiplier 10 is shown in FIG. 7. Outputs A1, A2 and A4 of CIR 3 are connected to the inputs of OR 240. In a smilar manner the outputs B1, B2, B4 and C1, C2, C4 and D1, D2, D4 and E1, E2, E4 and F1, F2, F4 and G1, G3, G4 and H1, H2, H4 of CIR 3 are respectively connected to the inputs of ORs 241, 242, 244, 245, 246 and 247 as shown. The output of OR 240 is connected to an input of NAND 255, while the output of OR 241 is connected both to the other input of NAND 255 by an inverter 248 and to an input of NAND 256. The output of OR 242 is connected both to the other input of NAND 256 by an inverter 249 and to an input of NAND 257. The output of OR 243 is both connected to the other input of NAND 257 by inverter 250 and to an input of NAND 258. The output of OR 244 is both connected to the other input of NAND 258 by inverter 251 and to an input of NAND 259. The output of OR 245 is both connected to the output of NAND 259 by inverter 252 and to an input of NAND 260. The output of OR 246 is both connected to the other input of NAND 260 by inverter 253 and to an input of NAND 261. The output of OR 247 is both connected to the other input of NAND 261 by inverter 254 and to an input of AND 268.

The outputs of NANDs 255 and 256 are connected to the inputs of AND 262. The output of AND 262 is connected to an output of exclusive ORs 270 and 271 and to an input of AND 263. The other input of AND 263 is connected to the output of NAND 257.

The output of AND 263 is connected to the other input of exclusive OR 221, to an input of exclusive OR 272 and to an input of AND 264. The other input of AND 264 is connected to the to the output of NAND 258. The output of AND 264 is connected to the other input of exclusive OR 272, to an input of exclusive OR 273 and to an input of AND 265. The other input of AND 265 is connected to the output of NAND 259. The output of AND 265 is connected to the other input of exclusive OR 273, to an input of exclusive OR 274 and to an input of AND 266. The other input of AND 266 is connected to the output of NAND 260. The output of AND 266 is connected to the other input of exclusive OR 274, to an input of exclusive OR 275 and to an input of AND 267. The other input of AND 261. The output of AND 267 is connected to the other input of exclusive OR 275 to an input of AND 268. The other input of AND 268 is connected to the output of OR 247. The output of NAND 255 is connected to an input of exclusive OR 269 and to the other input of exclusive OR 270. The other input of exclusive OR 269 is connected to a positive fixed voltage source.

The outputs of exclusive ORs 269, 271, 273 and 275 are connected to the inputs of OR 276. The outputs of exclusive ORs 270, 271, 274 and 275 are connected to the inputs of OR 277. The outputs of exclusive ORs 272, 273, 274 and 275 are connected to the inputs of 278.

The output of OR 276 is connected to inputs A1 and B2 of adder 279 and to an output B3 or adder 281. The output of OR 277 is connected to inputs A2 and B3 of adder 279 and to input B4 of adder 281. The output of OR 278 is connected to inputs A3 and B4 of adder 279 and input Bi or adder 282. The output of AND 268 is connected to input A4 of adder 279, input A1 of adder 280 and input B2 of adder 282. The outputs 1, 2, 3 and 4 of adder 279 are connexted to the inputs of A1, A2, A3 and A4 of adder 281 respectively while the outputs of 1, 2, 3 and 4 of adder 280 are connected to the inputs A1, A2, A3 and A4 of adder 282 respectively. Outputs C4 of adders 279 and 281 are respectively connected to inputs of CO of adders 280 and 282.

Circuitry of WCLT 8 and multiplier 11 is identical to ECLT 9 and multiplier 10. The outputs of ORs 240 through 247 inclusive are connected to WCLT 8 in a manner similar to that of ECLT 9 except that the orientation is reversed, that is, the output of OR 240 is connected to the inverter of WCLT 8 corresponding to inverter 254, the output of OR 246 is connected to the inverter and the NAND of WCLT 8 corresponding to inverter 253 and NAND 261, and so forth.

(6) East Character Segment Total (ECST 6) Circuitry

Figure 8:
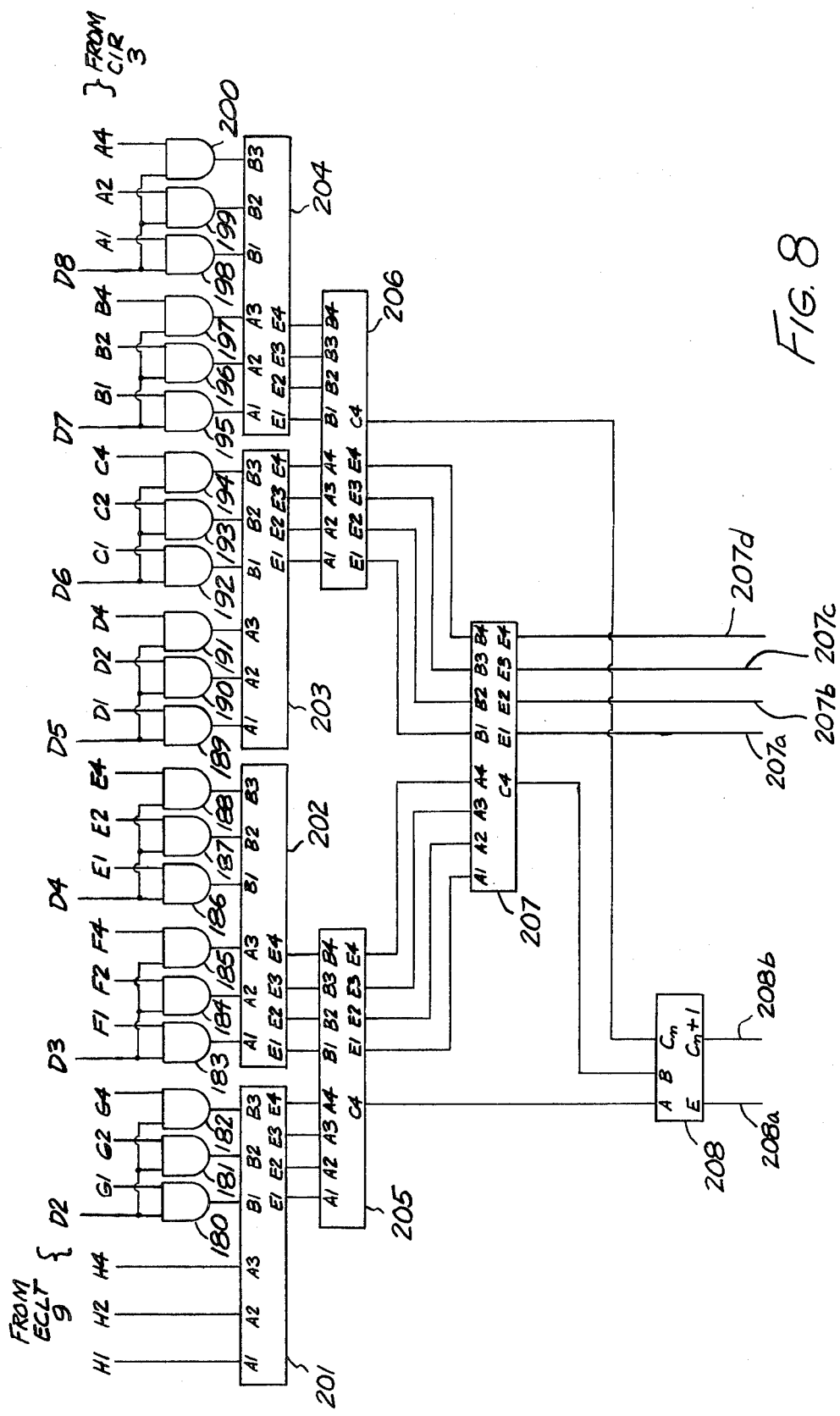
FIG. 8 is a circuit diagram for the east character segment total circuit ECST 6.

FIG. 8 is a schematic diagram of the circuitry for ECST 6. The outputs H1, H2 and H4 of CIR 3 are respectively connected to inputs A1, A2 and A3 of adder 201. The outputs G1, G2 and G4 of CIR 3 are connected respectively to an input of ANDs 180, 181 and 182, while the other inputs of said ANDs 180, 181 and 182 are connected to the output of D2 and ECLT 9. The outputs of ANDs 180, 181 and 182 are respectively connected to the inputs B1, B2 and B3 of adder 201. The outputs F1, F2 and F4 of CIR 3 are connected respectively to an input of ANDs 183, 184 and 185, while the other inputs of ANDs 183, 184 and 185 are connected to the output D3 of ECLT 9. The outputs of ANDs 183, 184 and 185 are respectively connected to the inputs A1, A2 and A3 of adder 202. The outputs E1, E2 and E4 of CIR 3 are connected respectively to an input of ANDs 186, 187 and 188, while the other inputs of said ANDs 186, 187 and 188 are respectively connected to the inputs B1, B2 and B3 of adder 202. The outputs D1, D2 and D4 of CIR 3 are connected respectively to an input of 189, 190, 191, while the other inputs of said ANDs 189, 190 and 191 re connected to the output D5 of ECLT 9. The outputs of ANDs 189, 190, and 191 are respectively connected to inputs A1, A2 and A3 of adder 203. The outputs C1, C2 and C4 of CIR 3 are respectively connected to an input of ANDs 192, 193 and 194, while the other inputs of said ANDs 192, 193 and 194 are connected to the outputs D6 of ECLT 9. The outputs of ANDs 192, 193 and 194 are respectively connected to the inputs of B1, B2 and B3 of adder 203. The outputs of B1, B2 and B4 of CIR 3 are respectively connected to an input of ANDs 195, 196 and 197, while the other inputs of said ANDs 195, 196 and 197 are respectively connected to inputs A1, A2 and A3 of adder 204. The outputs of A1, A2 and A4 of CIR 3 are respectively connected to an input of ANDs 198, 199 and 200, while the other inputs of said ANDs 198, 199 and 200 are connected to the output D8 of ECLT 9. The outputs of ANDs 198, 199 and 200 are connected to inputs B1, B2 and B3 of adder 204.

The four outputs of adder 201 are connected to four inputs of adder 205 as shown, while the other four inputs of adder 205 are connected to the four outputs of adder 202. The four outputs of adder 203 are connected to four inputs of adder 206 as shown, while the other four inputs of adder 206 are connected to the four outputs of adder 205. The outputs of adders 205 and 206 are connected to the eight inputs of adder 207. The three carry outputs of adders 205, 206 and 207 are connected to the inputs of adder 208 as shown.

The circuitry for WCST 8 is exactly the same as the circuitry in FIG. 8.

(7) North Character Segment Total NCST 15 Circuitary

Figure 9:
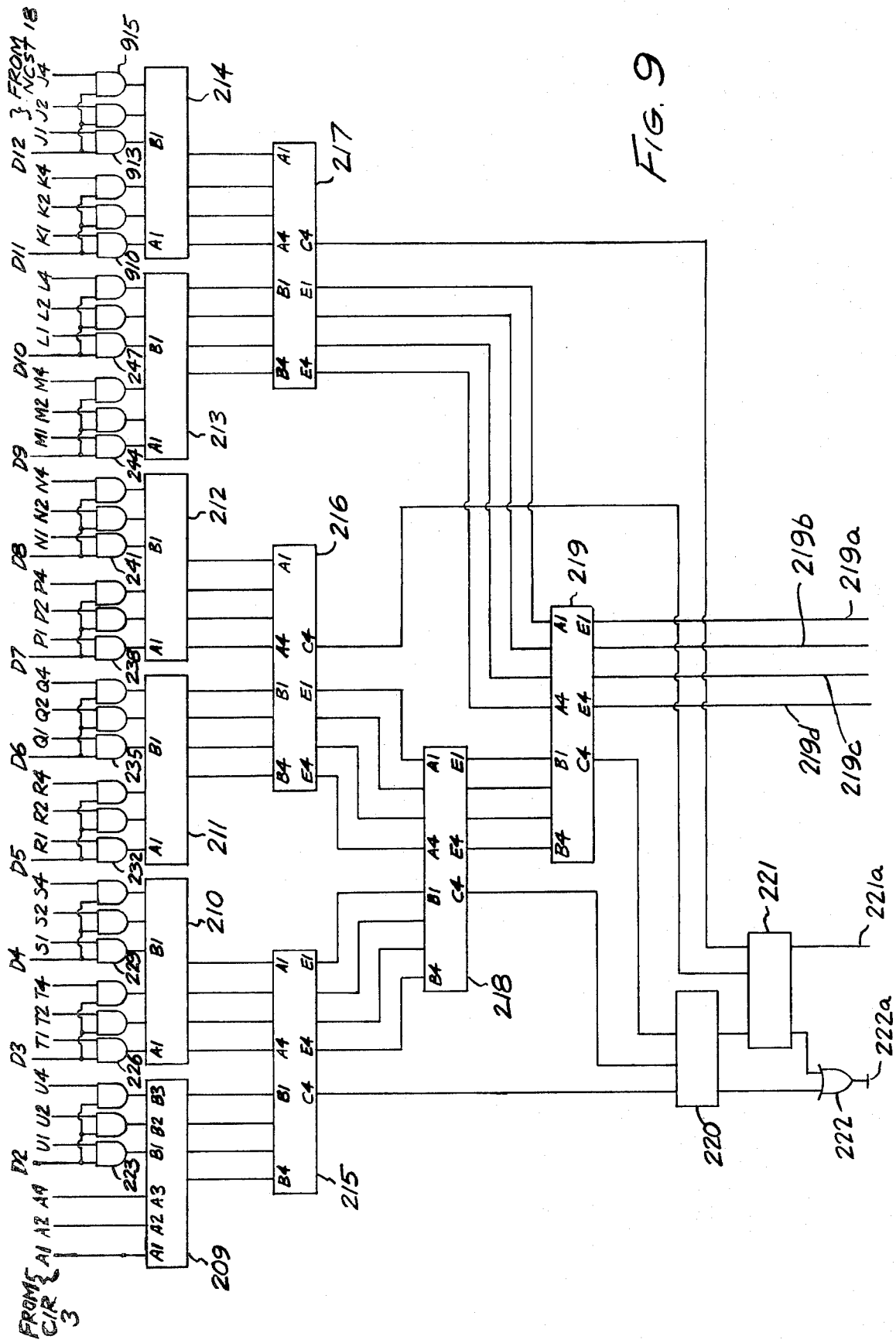
FIG. 9, is a circuit diagram for the north character segment total NCST 15 shown in FIG. 1b.

The circuitry for NCST 15 is shown in FIG. 9. Outputs A1, A2 and A4 of CIR 3 are respectively connected to inputs A1 A2 and A3 of adder 209. Outputs U1, U2 and U4 of CIR 3 are respectively connected to an input of ANDs 223, 224 and 225, while the other inputs of said ANDs 223, 224 and 225 are connected to the output of NCLT 18. The outputs of ANDs 223, 224 and 225 are respectively connected to inputs B1, B2 and B3 of adder 209. Outputs Ti, T2 and T4 of CIR 3 are respectively connected to an input of ANDs 226, 227 and 288, while the other inputs of ANDs 226, 227 and 228 are connexted to the output D3 of NCLT 18. The outputs of ANDs 226, 227 and 228 are connected to the inputs A1, A2 and A3 of adder 210. The outputs S1, S2 and S4 of CIR 3 are respectively connected to an input of ANDs 229, 230 and 231, while the other inputs of said ANDs 229, 230 and 231 are connected to output D4 of NCLT 18. The outputs of ANDs 229, 230 and 231 are respectively connected to the inputs of B1, B2 and B3 of adder 210. The outputs R1, R2 and R4 of CIR 3 are respectively connected to an input of ANDs 232, 233 and 234, while the other inputs of ANDs 232, 233 and 234 are connected to the output D5 of NCLT 18. The outputs of ANDs 232, 233 and 234 are respectively connected to the inputs A1, A2 and A3 of adder 211. The outputs Q1, Q2 and Q4 of CIR 3 are respectively connected to an input of ANDs 235, 236 and 237, while the other inputs of ANDs 235, 236 and 237 are connected to an output D6 of NCLT 18. The outputs of ANDs 235, 236 and 237 are connected to output D6 of NCLT 18. The outputs of ANDs 235, 236 and 237 are respectively connected to the inputs of B1, B2 and B3 of adder 211.

The outputs of P1, P2 and P4 of CIR 3 are connected respectively to an input of ANDs 238, 239 and 240, while the other inputs of ANDs 238, 239 and 240 are connected to output D7 of NCLT 18. The outputs of ANDs 238, 239 and 240 are respectively connected to inputs A1, A2 and A3 of adder 202. The outputs N1, N2 and N4 of CIR 3 are respectively connected to an input of ANDs 241, 242 and 243, while the other inputs of ANDs 241, 242 and 243 are connected to output D8 of NCLT 18. The outputs of ANDs 241, 242 and 243 are respectively connected to inputs B1, B2 and B3 of adder 212.

Outputs M1, M2 and M4 of CIR 3 are respectively connected to an input of ANDs 224, 245 and 246, while the other inputs of ANDs 244, 245 and 246 are connected to output D9 of NCLT 18. The outputs of ANDs 244, 245 and 246 are respectively connected to inputs A1, A2 and A3 of adder 213. Outputs L1, L2 and L4 of CIR 3 are respectively connected to an input of ANDs 247, 248 and 249, while the other inputs of said ANDs 247, 248 and 249 are connected to output D10 of NCLT 18. The outputs of ANDs 247, 248 and 249 are respectively connected to inputs B1, B2 and B4 of adder 213. Outputs K1, K2 and K4 are respectively connected to an input of ANDs 910, 911 and 912, while the other inputs of said ANDs 910, 911 and 912 are connected to output D11 of NCLT 18. The outputs of ANDs 910, 911 and 912 are connected respectively to inputs A1, A2 and A3 of adder 214. Outputs J1, J2 and J4 of CIR 3 are respectively connected to an input of ANDs 913, 914 and 915, while the other inputs of ANDs 913, 914 and 915 are connected to output D12 of NCLT 18. The outputs of said ANDs 913, 914 and 915 are connected to inputs B1, B2 and B3 respectively of adder 214. The four outputs of adders 209 and 210 respectively are connected to the eight inputs of adder 215. The four outputs of adder 211 and 212 respectively are connected to the eight inputs of adder 216. The four outputs of adders 213 and 214 respectively are connected to the eight inputs of adder 217, as shown. The four outputs of said adders 215 and 216 respectively are connected to the eight inputs of adder 218, while the four outputs of adders 218 and 217 respectively are connected to the eight inputs of adder 219. The carry outputs of adders 215, 218 and 219 are connected to the three inputs of adder 220. The outputs of adders 220 and the carry outputs of adders 216 and 217 are connected to the three inputs of adder 221. The two carry outputs of adders 220 and 221 are connected to the two inputs of OR 222. The circuitry for SCST 16 is identical to the circuitry for NCST 15.

(8) Adder and Acculator Circuitry

Figure 10:
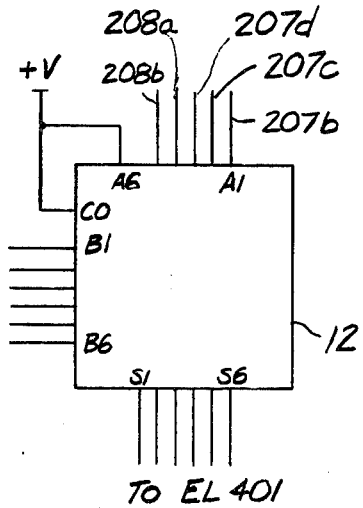
FIG. 10 is a circuit diagram showing adder 12 with its respective connections to ECST 6 and multiplier 10 shown in FIG. 1a and is typical of the adders 13, 22 and 23 and their respective connections.

FIG. 10 shows adder 12, which received signals from ECST6 and multiplier 10 and provides signals to cost accumulator EA 401. In FIG. 10 the outputs 207b, c, d and 208a and d of ECST 6 are connected to five inputs of adder 12, as shown. The six outputs of multiplier 10 are connected to six inputs of adder 12, as shown. The other inputs of adder 12 are tied to a positive voltage source. Adders 13, 22 and 23 of FIGS. 1a and 1b are generally similar to adder 12. The outputs of multiplier 10 and WCST 7 are connected to adder 13, the outputs of multiplier 20 and NCST 15 are connected to adder 22, and the outputs of multiplier 21 and SCST 16 are connected to adder 23.

Figure 11:
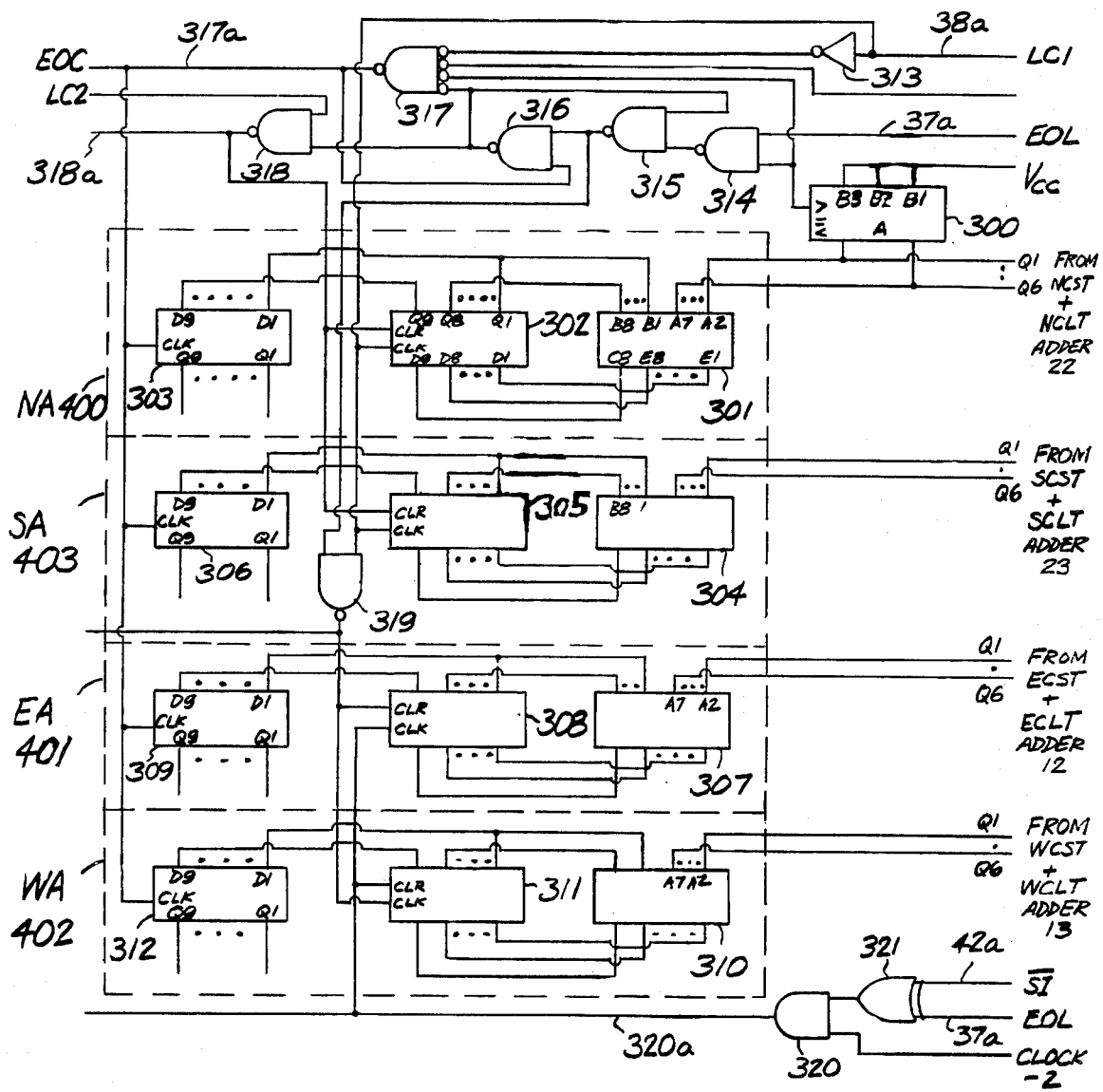
FIG. 11 is a circuit diagram showing the circuitry comprising north, south, east and west accumulators, respectively designated in FIGS. 1a and 1b as NA 400, SA 403, EA 401 and WA 402.

FIG. 11 shows the north, east, west and south accumulator circuits-NA400, EA401, WA402, and SA403 and associated circuitry. In FIG. 11, the six outputs of adder 22 are connected respectively to six inputs of comparator 300 and to the six inputs A2 through A7 or adder 201. The eight outputs of adder 301 are connected respectively to the eight inputs of accumulator storage register 302. The carry output of adder 301 is connected to the D9 input of register 302. The first eight outputs of register 302 are connected to the eight inputs B1 through B8 respectively of adder 301. All nine outputs of register 302 are also connected to inputs D1 through D9 respectively of storage register 303.

The six outputs of adder 73 are connected to inputs A2 through A7 of adder 304. The eight outputs of adder 304 are connected to eight inputs respectively of accumulator storage register 305, while the carry output of adder 304 is connected to the D9 input of register 305. The first eight outputs of register 305 are respectively connected to inputs B1 through B8 of adder 304. All nine outputs of register 305 are also connected respectively to the nine inputs of shift register 306.

The six ouotputs of adder 12 are connected to inputs A2 through A7 of adder 307. The eight outputs of adder 307 are connected to the first eight inputs respectively of shift register 308, while the carry output of adder 307 is connected to the ninth input of register 308. The first eight outputs of register 308 are respectively connected to inputs B1 through B8 of adder 307. All nine outputs of register 308 are also connected respectively to the nine inputs of register 309.

The six outputs of adder 13 are connected to inputs A2 through A7 of adder 310. The eight outputs of adder 310 are connected to the first eight inputs respectively of accumulator storage register 311, while the carryoutput of adder 310 is connected to the ninth input of register 311. The first eight outputs of register 311 are respectively connected to inputs B1 through B8 of adder 310. All nine outputs of register 311 are also respectively connected to the nine inputs of register 312.

Terminal 38a (of the control circuitry) provides the LC1 signal to the input of inverter 313, the clock inputs of registers 302 and 305 and to an input of NAND 319. Terminal 37a is connected to an input of NAND 314 to provide the IOL signal. The "greater than" output of comparator 300 is connected to the other input of NAND 314 and also to an input of AND 317. The output of inverter 313 is connected to an input of AND 317, while the output of NAND 314 is connected to an input of NAND 315. The output of NAND 315 is connected to an input of NAND 316 and also to the other input of NAND 319. The other input of NAND 316 is connected to the output of NAND 317. The output of NAND 316 is connected to an input of NAND 317, to an input of NAND 315 to complete a set-reset flip-flop circuit onsisting of 315 and 316 to an input of NAND 318. Terminal 40a of the control circuitry provides the LC2 signal to the other input of NAND 318, while the output of NAND 318 is connected to the clear inputs of registers 302 and 305. The output of NAND 319 is connected to the clear inputs of registers 308 and 311, while the clock inputs of registers 308 and 311 are connected to the output of AND 320. The inputs of AND 320 are respectively connected to clock 27 (to receive the clock 2 signal) and the output of exclusive OR 321. The inputs of said exclusive OR 321 are connected respectively to terminals 42a and 37a to receive the $\overline{S1}$ and EOL signals. The clock inputs of registers 303, 306, 309 and 312 are connected to the output of AND 317.

(9) Normalizer Circuitry

Figure 12:
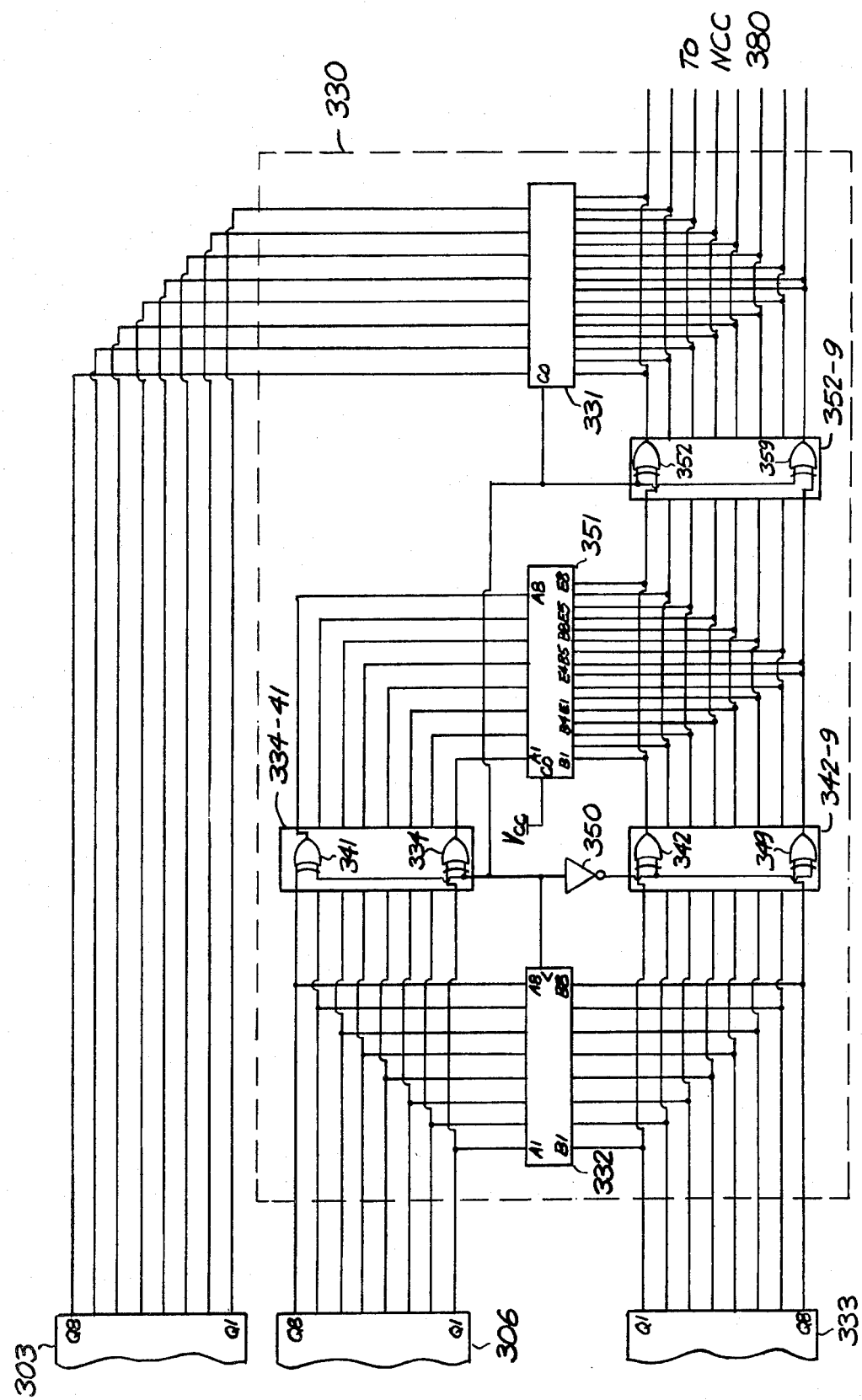
FIG. 12 is a circuit diagram showing the circuitry for the north normalizer NN 330 as shown in FIG. 1b.

FIG. 12 shows the circuitry for North normalizer NN 330. The outputs of register 303 are connected to the eight inputs A1 through A8 of adder 331 as shown. The outputs of register 306 are connected to eight inputs A1 through A8 of comparator 332, while the outputs of registers 333 are connected to the other eight inputs B1 through B8 of comparator 332 as shown. Each of the eight outputs of register 305 is connected to an input of one of the exclusive ORs 334 through 341, while the other inputs of exclusive ORs through 341 are tied to the "less than" output of comparator 332. Each of the eight outputs of register 333 is also connected to an input of one of the exclusive ORs through 349, while the other inputs of exclusive ORs 342 through 349 are tied to the output of inverter 350. The input of inverter 350 is tied to the "less than" output of comparator 332.

Each output of exclusive OR 334 through 341 is connected to an input A1 through A8 of adder as shown. Each output of exclusive OR 342 through 349 is connected to an input B1 through B8 of said adder 351 as shown. The carry input of adder 351 is connected to a positive fixed voltage source. Each output of adder 351 is connected to an input of one of exclusive ORs 352 through 359. The other inputs of exclusive ORs 352 through 359 and the carry input of adder 331 are connected to the "less than" output of comparator 332. Each output of exclusive OR 352 through 359 is connected to an input B1 through B8 respectively of adder 331 as shown. The Q1–Q8 outputs of adder 331 are the normalized outputs of NN330 which supplied to north comparison circuitry NCC380.

The circuitry for SN 360, EN 361 and WN 362 is identical to that of NN330. The inputs of NN 330 connected to the outputs of registers 303, 306 and 33 correspond to the inputs of SN 360 connected to the outputs of registers 306, 303 and 370. The inputs of EN 361 connected to registers 309, 312 and 371 correspond to the inputs of NN 330 connected to the outputs of registers 303, 306 and 333. The inputs of WN 362 connected to registers 312, 309 and 372 correspond to the inputs of NN 330 connected to the outputs of registers 303, 306 and 333.

(10) Comparison Circuitry

Figure 13:
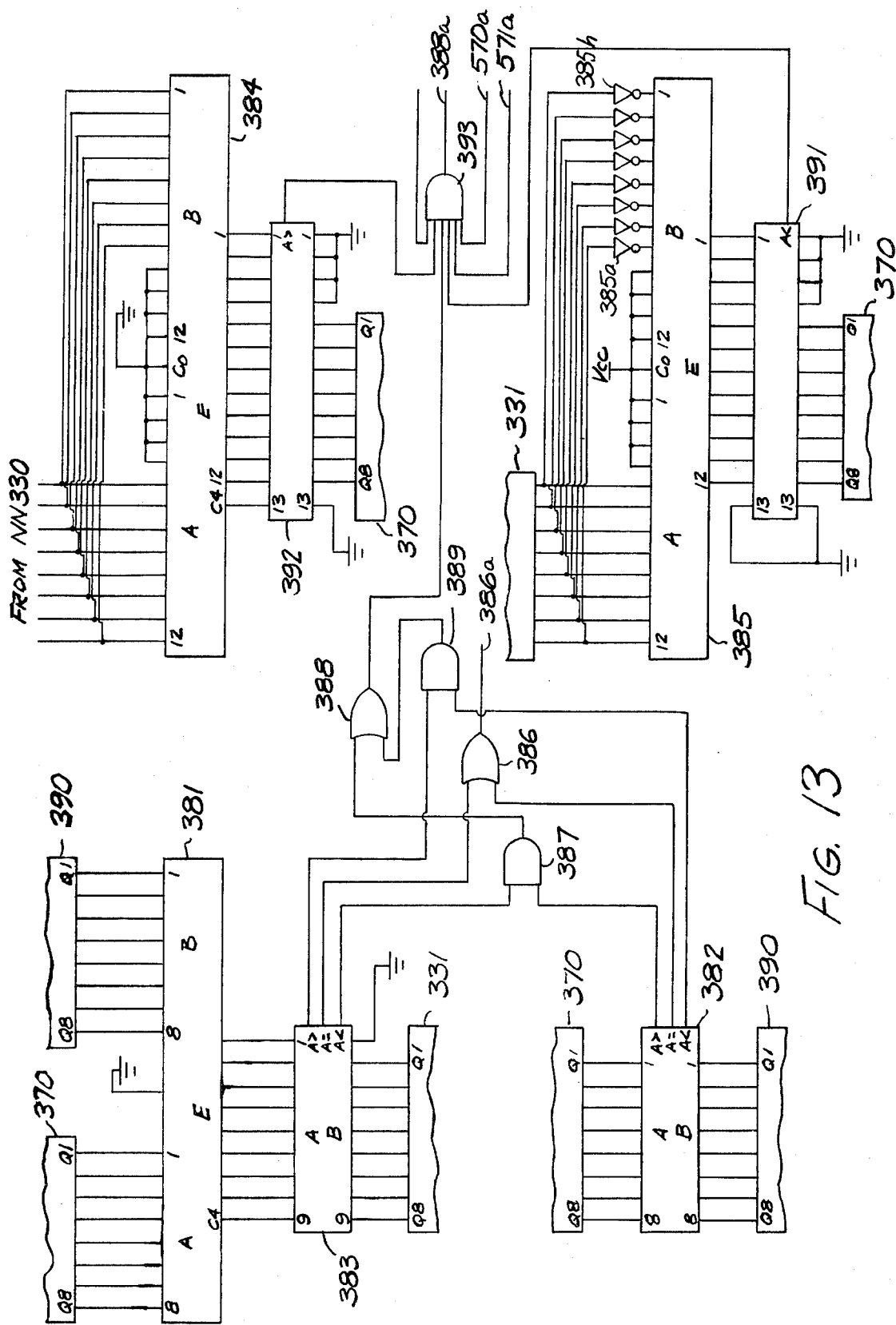
FIG. 13 is a circuit diagram showing the circuitry for the north comparison circuit NCC 380 shown in FIG. 1b.

In FIG. 13 north comparison circuitry NCC 380 is shown. The outputs of register 370 are connected to eight inputs each of adder 381 and comparator 382. The outputs of adder 381 are connected to nine inputs of comparator 381. The outputs of NN330 are connected to eight other inputs of comparator 383, with one input tied to ground as shown. The eight outputs of register 390 are connected to the other eight inputs each of adder 381 and comparator 382. The "greater than", "equal", and "less than" outputs of comparators 383 are connected respectively to an input of AND 389, an input of OR 386, and an input of AND 387. The "greater than", "equal" and "less than" outputs of comparator 382 are connected respectively to the other inputs of AND 387, OR 386 and AND 389. The output of ANDs 387 and 389 are connected to the inputs of OR 388.

The output of OR 388, the "greater than" output of comparator 392, the "less than" output of comparator 391 and terminals 570a and 571a are connected to the inputs of AND 393.

The eight outputs of NN 330 are connected to sixteen inputs of adder 384 as shown, while nine other inputs of adder 384 are grounded. The thirteen outputs of adder 384 are connected to thirteen inputs of comparator 392, the outputs of register 370 being connected to the fifth through twelfth other inputs of comparator 392. All other inputs of comparator 392 are grounded.

The eight outputs of NN 330 are also connected to sixteen inputs of adder 385 as shown, while nine other inputs of adder 385 are tied to a positive fixed voltage source. The first twelve outputs of adder 385 are connected to the first twelve inputs of comparator 391. The outputs of register 370 are connected to the fifth through twelfth other inputs of comparator 391 as shown. All other inputs of comparator 391 are grounded. The circuitry for SCC 502, ECC 500 and WCC 501 is identical to the circuitry of NCC 380.

(11) Contour Value Circuitry

Figure 14:
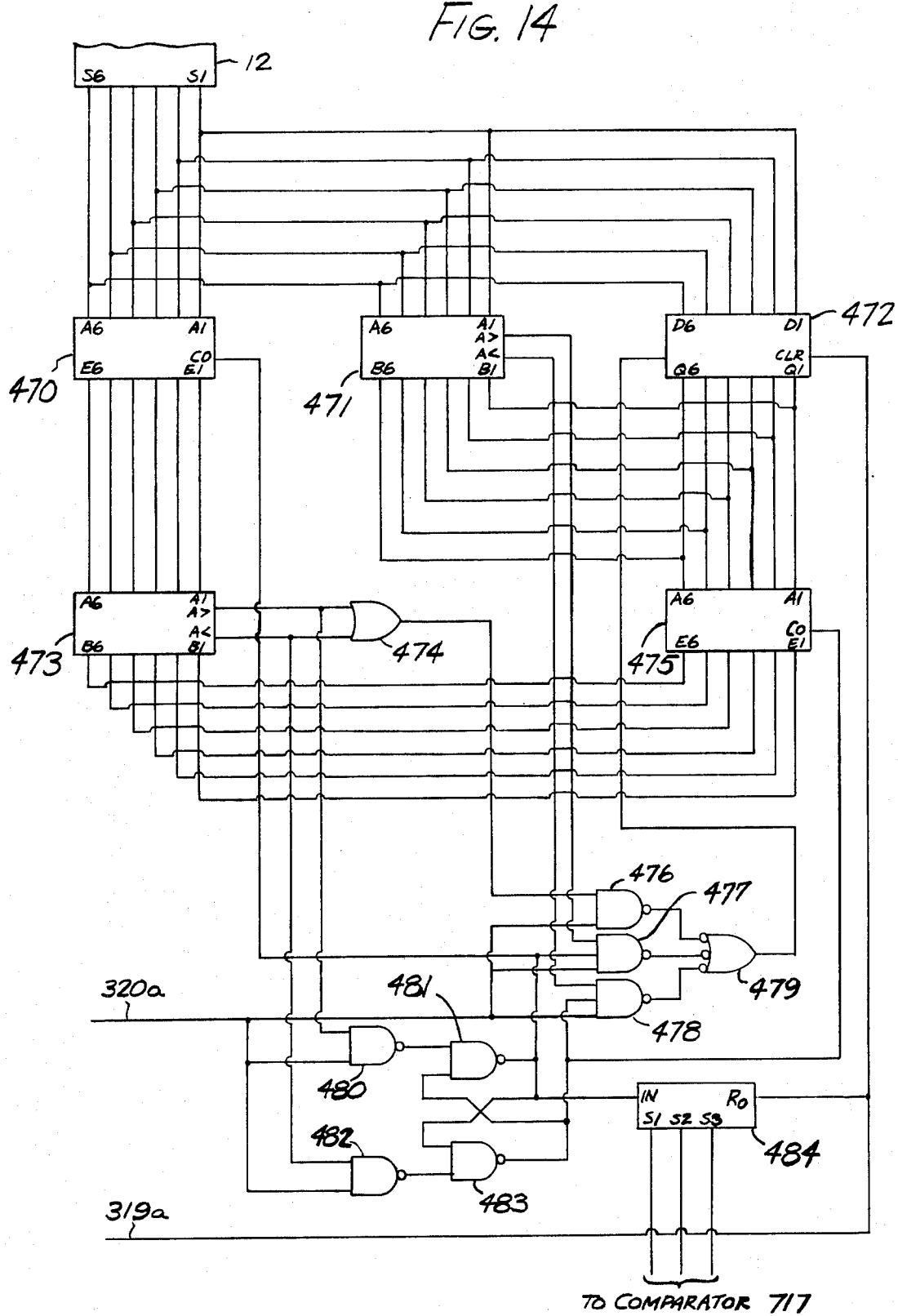

In FIG. 14, the circuitry of east contour value circuitry ECVC 710 is shown. The six outputs of adder 12 are connected to six inputs of adder 470, six inputs of comparator 471, and six inputs of register 472 as shown. The six outputs of adder 470 are connected to six inputs respectively of comparator 473, while the six outputs of register 472 are connected to the six inputs of adder 475 and the other six inputs of comparator 471. The six outputs of adder 475 are connected to the other six inputs of comparator 473 respectively.

Terminal 320a is connected to an input of NANDs 476, 477, 478, 480 and 482. Terminal 319a is connected to the clear inputs of counter 484 and register 472. The other inputs of NANDs 480 and 482 are connected respectively to the "greater than" and "less than" outputs of comparator 473. OR 474 has its inputs connected to the "greater than" and "less than" outputs of comparator 473, the outputs of OR 474 being connected to the other input of NAND 476. The outputs of NANDs 480 and 482 are connected respectively to an input of NANDs 481 and 483. The other inputs of NANDs 481 and 483 are connected respectively to outputs of NANDs 482 and 481. The output of NAND 481 is connected to the input of adder 484, a second input of NAND 477, and to the carry input of adder 470. The output of NAND 483 is connected to a second input of NAND 478, and to the carry input of adder 475. The third input of NAND 478 is connected to the "less than" output of comparator 471, while the third input of NAND 477 is connected to the "greater than" output of said comparator 471. The outputs of NANDs 476, 477 and 478 are inverted at the inputs of OR 479. The output of said OR 479 is connected to the clock input of register 472.

The circuitry for WCVC 712, SCVC 713 and NCVC 711 is identical to the circuitry for ECVC 710, except that for SCVC 713 and NCVC 711, terminal 38a is substituted for terminal 320a, and terminal 318a is substituted for terminal 319a.

(12) Style Value Circuitry

Figures 15A, 15B:
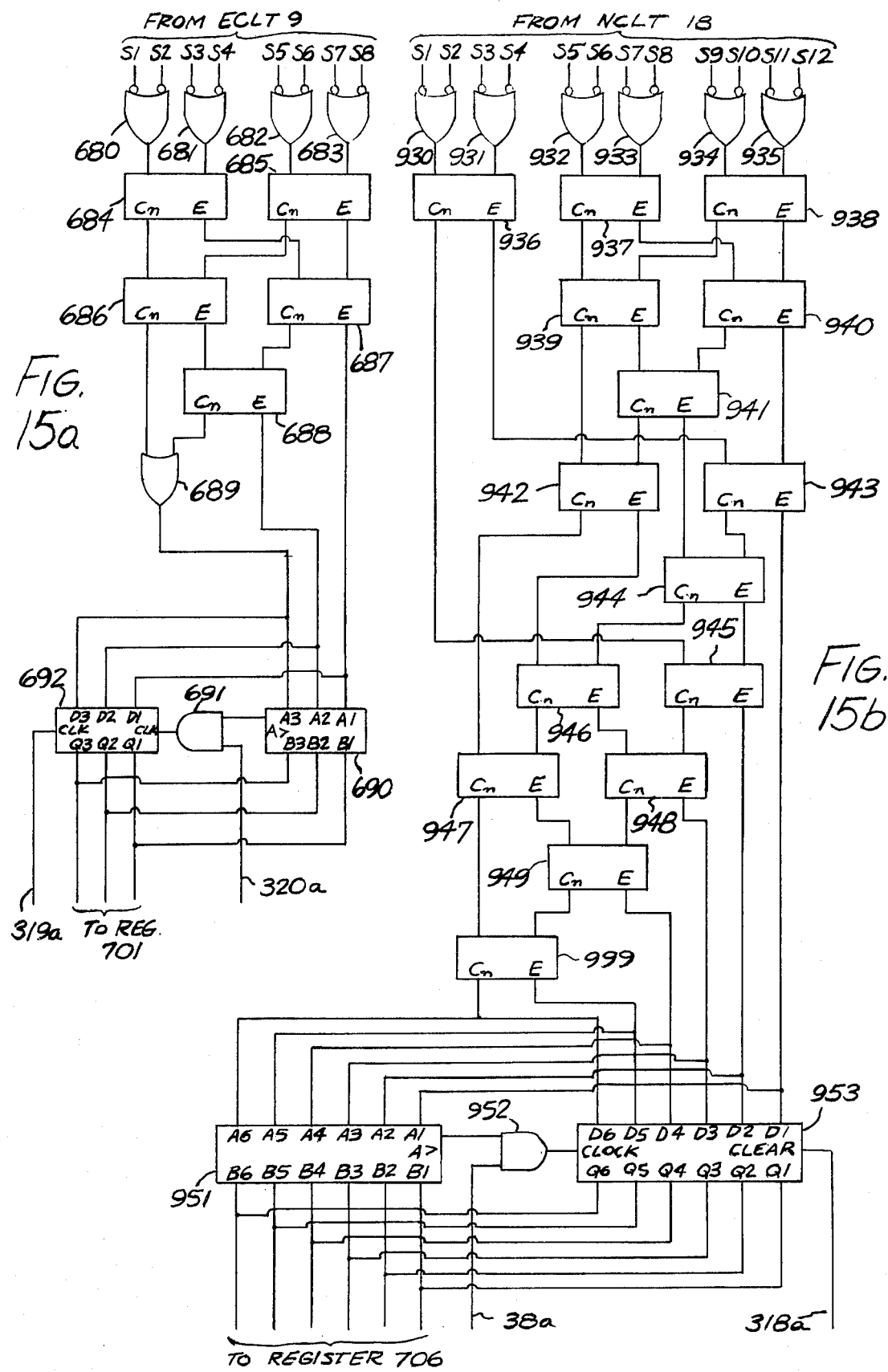
FIGS. 15a and 15b are circuit diagrams showing the horizontal style value circuit HSVC 700 and the vertical style value circuit VSVC 705, respectively.

The circuitry for horizontal style value circuitry HSVC 700 is shown in FIG. 15a. The outputs of NANDs 255 and 256 are connected to and inverted at the inputs of OR 680, the outputs of NANDs 257 and 258 are connected to and inverted at the inputs of OR 681, the outputs of NANDs 259 and 260 are connected to and inverted at the inputs of OR 682, and the outputs of NAND 261 and OR 247 are connected to and inverted at the inputs of OR 683. The outputs of ORs 680 and 681 are connected to the inputs of adder 684, while the outputs of ORs 682 and 683 are connected to the inputs of adder 685. The carry outputs of adders 684 and 685 are connected to the inputs of adder 686, while the sum outputs of adder 684 and 685 are connected to the inputs of adder 687. The sum output of adder 686 and the carry output of adder 687 are connected to the inputs of adder 688, while the carry outputs of adder 686 and 688 are connected to the inputs of OR 689. The outputs of adder 687 and 688 and the output of OR 689 are connected to the inputs of comparator 690 and also to the inputs of register 692. The outputs of register 692 are connected both to the other inputs of comparator 690 and to the inputs of HSVR 701. The "greater than" output of comparator 690 and terminal 320a are connected to the inputs of AND 691. The clear input of register 692 is connected to terminal 319a, while the clock input of register 692 is connected to the output of AND 691.

The circuitry for VSVC 705 is shown in FIG. 15b. It is similar to the circuitry for HSVC 700 except that there are twelve inputs (from NCLT 18) instead of the eight inputs into HSVC 700.

(13) Contour Value and Style Value Comparators

Figure 16:
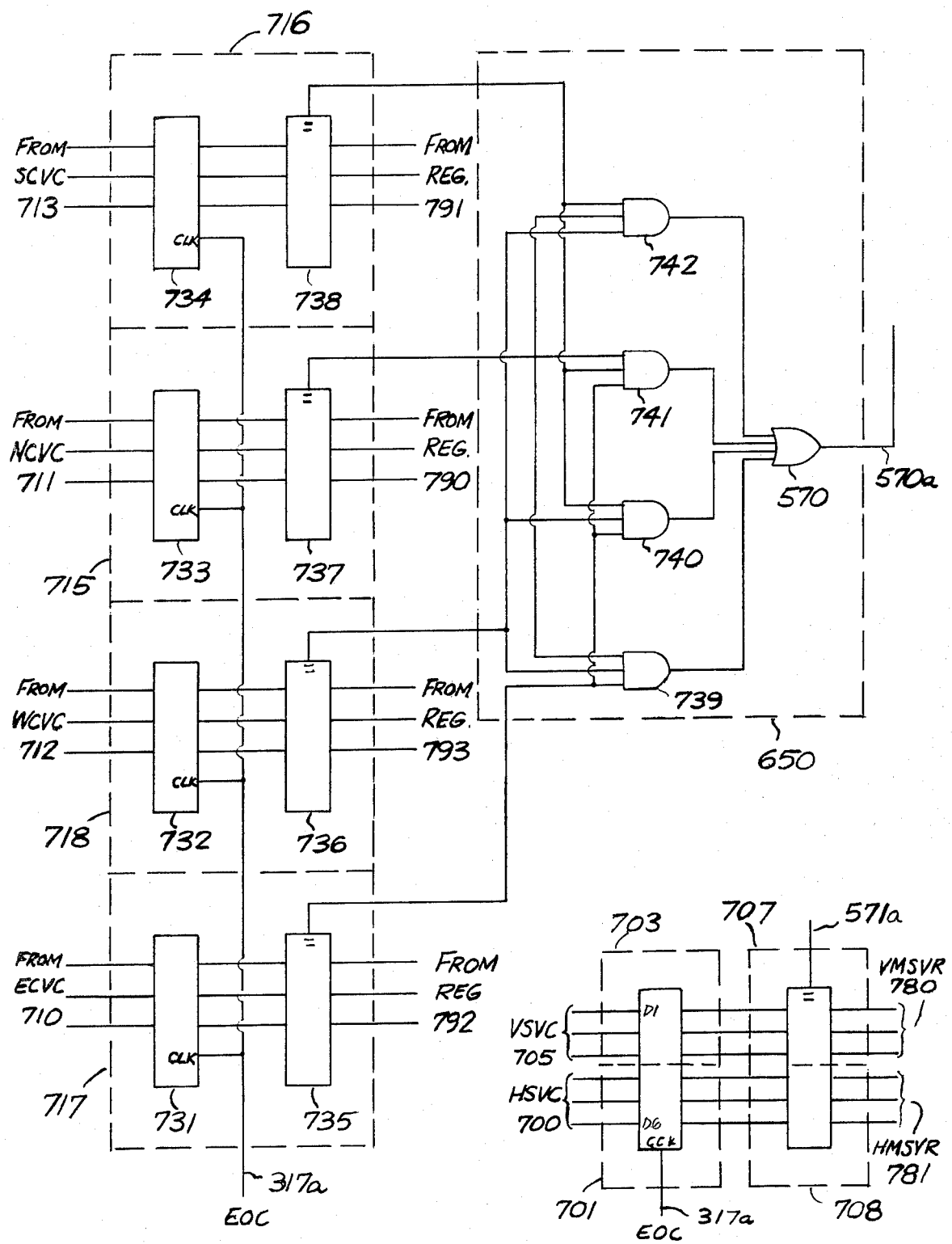
FIG. 16 is a circuit diagram showing the circuitry for comparators 715, 716, 717 and 718, a portion of the judgment circuit JC 650 and the circuitry for comparators 707 and 708.

In FIG. 16, the circuitry for north, south, east and west contour value comparators 715, 716, 717 and 718 is shown. Each comparator 715, 716, 717 and 718 is comprised of a register 731, 732, 733 and 734 respectively, the outputs of which are connected to inputs of comparators 735, 736, 737 and 738, as shown. The other inputs of comparators 735, 736, 737 and 738 are respectively connected to the outputs of east, west, north and south memory contour registers 792, 793, 790 and 791 respectively. Terminal 317a is connected to the clock input of each register 731, 732, 733 and 734.

The "equal" outputs of comparators 735, 736, 737 and 738 are connected to a portion of judgment circuit 650 as contained within the broken line in FIG. 16. The "equal" output of comparator 735 is connected to an input of ANDs 739, 740 and 741, while the "equal" output of comparator 736 is connected to a second input of ANDs 739 and 740 respectively and to an input of AND 742.

The "equal" output of comparator 737 is connected to a third input of AND 739, a second input of AND 741 and AND 742 respectively, while the "equal" output of comparator 738 is connected to a third input of AND 740, AND 741 and AND 742 respectively. The outputs of ANDs 739, 740, 741 and 742 are connected to the inputs of OR 570, the output of which is connected to terminal 570a.

FIG. 16 also shows the horizontal and vertical style value registers HSVR 701 and VSVR 706 and the horizontal and vertical style value comparators 708 and 707. As shown in FIG. 16, HSVR 701 and VSVR 706 are combined in this embodiment into a six bit register 703, the clock input of which is connected to terminal 317a. Horizontal and vertical style value comparators 708 and 707 in this embodiment are combined into one six bit comparator 571, six inputs of which are connected to the six outputs of register 703. The other six inputs are connected to the outputs of horizontal and vertical memory style value registers HMSVR and VMSVR 780 as shown. The "equal" output of comparator 571 is connected to terminal 571a.

(14) Judgment Circuit

A portion of the circuitry for judgment circuit 650 is shown in FIG. 17. Inputs A2 and A1 of adder 620 are connected to the terminals 338a and 386a of NCC 380. Inputs B2 and B1 of adder 620 are connected to the terminals of SCC 502 corresponding to said terminals 388a and 386a. Inputs of A2 and A1 of adder 621 are connected to the terminals of ECC 500 corresponding to said terminals 388a and 386a, while inputs B2 and B1 of said adder 621 are connected to the terminals of WCC 501.

The three outputs of each of adder 620 and 621 are connected to the six inputs of adder 622 as shown. The four outputs of adder 622 are connected to four inputs of comparator 623. The three inputs B1, B2 and B4 of comparator 623 are connected to ground while input B3 is connected to a high fixed voltage source. The "greater than" output of comparator 623 is connected to one input of AND 623b, the other input of AND 623b being connected to clock 27. The output of AND 623b is connected to the clock input of registers 390, 450, 451, 452 and 900.

(15) Detailed Description of Operation

The typical operation of the invention will be explained by use of the numeral "2" shown as an example character in FIG. 2a. As shown in FIG. 3, a 2mHz clock 27 is provided to give the device a speed of identification of more than 15,000 characters per second. Each cycle of clock 27 clocks shift register 34, the first eleven outputs connected through resistors to operational amplifier 35. The VDS signal at terminal 35a is shown at FIG. 4b, and is connected to conventional vertical deflection drive circuitry for a conventional video camera tube to provide twelve scanning point positions in each vertical line. After the twelfth scanning point is encluntered, the VDS signal at terminal 35a remains steady for six cycles of clock 27. During the sixth cycle the cascaded counter arrangement comprising counters 45, 46 and 47 is incremented by one, causing a step increase in the voltage level of the output of operational amplifier 54, which is connected to the horizontal deflection drive circuitry of said tube and causes the scanning point to move horizontally to the adjoining vertical scanning line. The VDS signal at terminal 35a will then cause said tube to scan said new vertical scanning line at twelve discrete scanning point positions as shown in FIG. 2a.

The bank of switches 51 preset the number of vertical lines the tube will scan to the right before returning to the leftmost vertical line. When this rightmost limit has been reached NANDs 52 and 53 put the device in search mode by causing said cascaded counter arrangement to be counted down by one for each cycle of clock 27 until said counters 45, 46 and 47 zero out moving the scanning point horizontally to the leftmost limit. Then the cascaded counter arrangement is incremented by one for each cycle of clock 27 moving the scanning point to the right along the next lowest horizontal line until the rightmost limit is encountered. This procedure is repeated until a scanning point position is encountered which generates an arbitrarily set binary value of 110 from the conventional 3 binary bit analog to digital converter ADC 2, which then enables NAND 30 to take the invention out of the search mode, and enables the vertical scanning process to proceed once again.

As shown in FIG. 5, the ones bit output of ADC 2, output 2a, is connected to ANDs 70 and 71, which provide a gating function depending on whether the scanning point is moving upwardly (south to north) or downwardly (north to south). If the scanning point is being moved downwardly, terminal 41b is high and enables AND 71. AND 86 enables clock 27 to clock registers 72 through 85, and thus the ones bit output 2a will first be introduced into the first position of register 72, and then be clocked into the succeeding registers through 83, as succeeding one bit outputs are clocked into the registers until the twelfth ones bit output 2a, corresponding to the last scanning point position in that vertical line, has been clocked into register 72. Terminal 41b wil then go low and disable AND 71, and terminal 41a will go high thus enabling AND 70. When the device now scans upwardly along the next vertical scanning path the ones bit binary output 2a will be stored sequentially in the shift registers 84 and 85. After all twelve scanning point positions have been scanned, terminal 39a goes low and permits the contents of registers 84 and 85 to be loaded serially into registers 72 through 83 as shown. The process is simultaneously done with identical circuitry for the twos bit output 2b, and fours bit output 2c of ADC 2.

After the registers 72 through 83 are serially loaded, terminal 41b goes high and terminal 41a goes low. Thus the next ones bit output of ADC 2 will be clocked into the first position of register 72 and the contents in any position of registers 72 through 82 will be clocked into the corresponding position of the register connected to the outputs of said first register. However, the contents of each position in register 83 will be clocked into the next highest position of register 72; i.e. the contents of the first position of register 83 will be clocked into the second position of register 72, and so on. Thus, CIR 3 will contain a binary representation of the character being as shown in FIG. 2a.

North and south penetration values are derived for each vertical line immediately upon the storage of the complete line in the right hand position of registers 72 through 83, and the corresponding registers for the outputs of 2b and 2c of ADC 2. For convenience, the third vertical line from the left in FIG. 2b will be assumed to be the last complete vertical line clocked into CIR 3. Therefore, in FIG. 6, the outputs of ORS 87, 88 and 89 will be zero, since the first three scanning point positions contain no character material and thus the outputs of ADC stored in said positions were low. The outputs of ORs 90 and 91 will be high, since the fourth and fifth scanning positions from the top contains character material. The output of OR 92 will be low. This causes the output of NAND 114 to be low, which in turn forces the outputs of ANDs through 131 to be low, while the outputs of ANDs 121 through 123 will be high. In turn, only exclusive OR 136 will be high, and the outputs of OR 143 and 145 will be high, signifying that five positions of the third-left vertical line going downward are encountered before a dark to light transition point (defined prior as the north transition point) is encountered. Adders 147 through 150 comprise multiplier 20 and are connected so that the number represented by the outputs of ORs 143 through 146 (in our case, 5) is multiplied by a factor of seven.

Simultaneously, NCST 15, shown in FIG. 9, sums the binary representations of the scanning point positions in said in last-clocked vertical line contained in CIR 3 before said north transition point is encountered. This is accomplished by the enable outputs D2 through D12 of NCLT 18; the output must be high before the binary representation contained in CIR 3 corresponding to said enable output may be gated to the adders 209 through 214. In the instant example, outputs D2 through D5 are high, thus enabling the top five positions in the third leftmost vertical line of CIR 3 to be summed by the adders 209 through 221, thus causing the binary representation of the number 9, which is 001001, to appear at terminals 222a, 221a and 219a, c, b, and a, respectively.

The outputs of multiplier 20 and NCST 15 are connected to adder 22, a conventional six bit binary adder, in the way shown in FIG. 10, to cause the output to be the difference between twice the number outputted by multiplier 20 and the number produced by NCST 15, which is $2 \times 35 - 9 = 61$. In FIG. 11, this number, the north penetration for this vertical line, is added to all the other north penetration values previously derived and held in register 302 of NA 400 by adder 301, the output of adder 301 then being gated into register 302 by the LCI signal (FIG. 4f) gives sufficient time to allow all transients to die in the circuitry before register 302 is clocked to accept the new accumulated north penetration value.

The same procedure is performed by similar circuitry for the south penetration value for the vertical line last stored in CIR 3 by SCLT 19, multiplier 21, SCST 16, and adder 23. Said south penetration value is then added to the accumulated south penetration values contained in register 305 by adder 304, the output of adder 304 then being gated back into register 305.

Determining the east and west accumulated penetration values requires a different procedure. In FIG. 11, registers 308 and 311 of east west accumulator 401 and 402, respectively are cleared after every complete vertical line is stored in CIR 3, unless the north penetration values of the last stored line is less than an arbitrary number set at seven by comparator 300. This is called a "clean" line.

As soon as the entire vertical line preceding a clean line is clocked into CIR 3, the representation of the top horizontal line in CIR 3 is transmitted to ECSD 5, initiating the process of generating east and west penetration values corresponding to said top horizontal line. When the first binary representation of said clean line is clocked into the first position of register 72, this causes the binary representations of the top horizontal lines to be clocked into register 72, this moving up the initial second-top horizontal lines into register 83. Said circuitry then produces east and west penetration values for this line, which are subsequently accumulated in EA 401 and WA 402. In a similar manner all horizontal line binary representations are moved into register 83 to be transmitted to other circuitry. Assume that the third top horizontal line of CIR 3, as shown in FIG. 2b, is now in register 83 and the two other topmost registers for the twos bit and fours bit output of ADC 2. Since the clean line is not yet complete in CIR 3, the representation is:

000 000 000 000 111 111 111 100 assuming no character material was sensed in the line preceding the leftmost line shown in FIG. 2b.

In FIG. 7, the outputs of ORs 244 through 247 would be low, since all the inputs are low. The outputs of ORs 240 through 243 would be high. This causes the outputs of NANDs 255, 256, 257, 259, 260 and 261 and the outputs of ANDs 262 and 263 to be high. The outputs of ANDs 264 through 268 will be low. Only the output of exclusive OR 272 will be high, signifying that four scanning point positions will be to the east of the east transition point. This number 4 is multiplied by a factor of seven by multiplier 10 to produce 28. This number is transmitted to adder 12 as shown.

Simultaneously, ECST 6 sums the binary representations of each scanning point position to the right, or east, of the east transition point. Outputs D5 through D8 of ECLT 9 are high, while outputs D2 through D4 are low. Therefore only the four eastmost positions of the line will be gated to the adders 203 and 204. In the instant example the resultant sum would be 25. This number is fed to adder 12 which subtracts the number outputted by ECST 6 from twice the number outputted by multiplier 10, or $2 \times 28 - 25 = 31$. This is the east penetration value for the third top horizontal line and is transmitted to adder 307 of EA 401, where it is summed with the prior east penetration values, and then clocked into register 308 by AND 320.

The same procedure is followed by WCLT 8, multiplier 11, WCST 7, and adder 13 to derive the west penetration value for the third top horizontal line which is 87. This penetration value is then summed with the prior west penetration values stored in register 311 by adder 310, and the resultant sum is clocked into register 311 by AND 320.

As shown in FIG. 11, if a clean line is sensed by comparator 300 and its associated logic when terminal 38a is pulsed, the contents of registers 302, 305, 308 and 311 are gated into registers 303, 306, 309 and 312 respectively, where the accumulated penetration values for that unknown character may be held safely while the invention starts scanning the next unknown character.

In FIG. 14, ECVC 710 receives the individual east penetration values commencing at the top of the unknown character generated by the above circuitry and increments counter 484 by one every time the penetration values reach a local minimum, i.e., when the penetration values start getting larger after a series of progressively smaller penetration values have been received. The contents of counter 484 are cleared after each line is clocked into CIR 3 unless said last-clocked line was a clean line, at which time the contents of counter 484 will be stored in comparator 717 and compared with east contour values of known characters stored in RAM 950, as more fully explained below. Similar procedures are followed by WCVC 712, NCVC 711 and SCVC 713.

In FIG. 15a, HSVC 700 adds the number of positive logic low level signals produced by outputs S1 through S8 of ECLT 9. Each of said low level signals corresponds to a dark to light transition point, and HSVC 700 counts the transition points encountered in each horizontal line contained in CIR 3 and compare that number with the horizontal value contained in register 692. If the first number is greater than the horizontal style value contained in register 692, said first number will be gated into register 692. Register 692 is cleared, along with registers 308 and 311, if the end of the character scanned is not sensed (i.e., if a "clean" line has not yet been introduced into CIR 3). When a clean line is sensed, the number contained in register 692, which is the highest number of dark to light transition points sensed in any horizontal line in CIR 3, is gated into HSVR 701. VSVC 705 performs the same function, counting dark to light transition points, on the latest-entered vertical line in CIR 3. The highest number of dark to light transitions is stored until a clean line is entered into CIR 3, whereupon this number is transmitted to VSVR 706, and the registers of VSVC 705 are cleared to begin the same procedure for the next character to be sensed.

Before the mechanism is able to recognize characters, it must be first "educated". This is accomplished by scanning a line of material that contains examples of all the characters in a particular type font, deriving north, south, east and west accumulated penetration values, horizontal and vertical style values, and north, south, east and west contour values for each character scanned and storing these values for each character in a memory, such as a random access memory 950. The mechanism then draws on these stored values to find the best "fit" to the particular unknown character.

In operation, after the various values of the unknown character are derived, means (not shown) retrieve the stored values from RAM 950 and compare the values for each stored character in RAM 950 with the values derived for the unknown character.

For each comparison, the accumulated penetration values of the unknown character are "normalized" by the penetration values of the known character retrieved from RAM 950. This normalization process adjusts any displacement of the unknown character upon the background relative to the placement of said example character used in the education cycle. The circuitry for north normalizer 330 is shown in FIG. 12, and shows that the normalization process begins by comparing the south accumulated penetration value of the unknown character with the south accumulation penetration value retrieved from RAM 950. If the first said penetration value is greater than the second said value, this indicates that the unknown character is shifted upwards on the background, as compared with the known character being compared. The difference between two penetration values is derived by adders 351 and this difference is then added to the north accumulated penetration value of the unknown character, thus in effect "moving down" the character to conform to the known character. This same process is performed for the south, east and west accumulated penetration values of the unknown character by south, east and west normalizers 360, 361 and 362. The normalized values are then compared with the penetration values of the known character.

In FIG. 13, the north accumulated penetration value of the known character, held in register 370, is added to the number contained in candidate register 390, which contains the north accumulated penetration value of a previously retrieved known character which has so far best fit the unknown character. The register 390 will contain zero if no previously known character retrieved from RAM 950 has fit the unknown character within certain preset limits as explained below. If twice the normalized north accumulated penetration value equals the sum of the penetration values contained in register 370 and 390, the output of OR 386 will be a positive logic high level, corresponding to a "no decision" signal. If the normalized value of NN 330 is less than said sum, and the value in register 370 (the currently retrieved value) is less than the value in register 390 (previously retrieved value), or if the normalized value of NN 330 is greater than said sum, and the value in register 370 is greater than the value in register 390, the output of OR 388 will be at a positive logic high level, signifying that the currently retrieved NAPV is closer to the unknown character normalized NPAV than the value stored in register 390. Adders 384 and 385 and comparators 391 and 392 test the value contained in register 370 to determine whether said value is within 6.25% (1.16) of the normalized NAPV of the unknown character. If this is true, the outputs of comparators 391 and 392 that are connected to AND 393 will be at a positive logic high level. The other two inputs of AND 393 will be at a positive logic high level if three out of the four unknown character contour values are equal to the corresponding contour values of the currently retrieved known character; and if both the horizontal and vertical style values of the unknown character are equal to the corresponding values of the currently retrieved known character. If all five inputs of AND 393 are high, the output of AND 393 will be high, indicating a "yes" vote. The outputs of NCC 380, SCC 502, ECC 500 and WCC 501 are then added together by judgment circuitry 650. As shown in FIG. 16, said "yes" vote from any comparison circuitry, (indicating that the currently retrieved accumulated penetration value, with the associated style and contour values, have satisfied the above stated criteria) is given a value of two, while each "no decision" vote is given a value of one. If the total of all said votes is greater than four, the output of comparator 623 will be at a positive logic high level, and the north, south east and west accumulated penetration of the current known character will be gated into the candidate registers 390, 452, 450 and 451 respectively, and the current RAM 950 address will be gated into register 900.

The process will then be repeated once per cycle of clock 27, retrieving the penetration, style, and contour values of the next known character contained in RAM 950, and comparing said values in the same manner as explained above. After all the character values of the unknown character, register 900 will contain the RAM address of the known character which is the best fit to the unknown character. The identification process complete, suitable interface circuitry (not shown) may retrieve the address stored in register 900, said address being identical to the computor character code for the character identified.

If, however, no character stored in RAM 950 satisfies the comparison requirement, the circuitry in FIG. 18 provides a method of visual identifaction of that unknown character. As shown, a shift register 972 holds the last-scanned unknown character. As the unknown characters are scanned, as long as the output of NAND 971 is high, the information from ADC 2 is gated through OR 973, and 974 and OR 975 and into register 972. The output of NAND 971 will go low if, at the beginning of the scanning of a new unknown character, the flipflop comprising NANDs 976 amd 977 has't been triggered by AND 623b, signifying that identifying values were loaded into the respective candidate registers. This will have the effect of "looping" the characters stored in register 972 through AND 978 and OR 975, enabling the stored characters to be viewed by the operator upon a viewing device such as CRT 979. The operator, upon viewing the unknown character, decides what it is and presses the appropriate key on a keyboard 980. Means (not shown) access RAM 950 at the address selected by keyboard 980, and write the penetration, style and contour values of the unknown character into the proper positions in RAM 950 corresponding to the selected address. During this time the scanning of the mechanism is disabled by the outputs of NANDs 970 and 971. After the values are written into RAM 950 at the proper address, the outputs of NANDs 976 and 971 are set high, and the outputs of NANDs 977 and 970 are set low, thus enabling the mechanism to resume scanning the unknown characters. This provides an easy method of correcting for variations in character darkness, due to wear of the type ribbon and other factors.

(16) Conclusion

The optical character recognition system of the present invention offers significant improvements over the prior art systems. It is capable of high speed scanning and identification of conventional printed characters in a variety of different fonts. Automatic correction of mispositioning of characters and capability for compensation of type ribbon wear are among the other advantageous features of the system.

Although the present invention has been described with reference to preferred embodiments, workers skilled in the art of optical character recognition will recognize that changes may be made in form and details without departing from the spirit and scope of the present invention.

What is claimed is:

1. A method of electronically recognizing characters, comprising:
   scanning an area containing characters to be identified and producing electrical signals indicative of scanning positions at which input material of the characters is present;
   producing style value criteria for each character to be identified by counting the number of signal producing transitions from each scanning operation;
   producing penetration value criteria for each character to be identified by sensing the distance from a predetermined reference location to signal producing portions of the character disposed closest to said reference location;
   deriving style value and penetration value signals respectively indicative of the sensed style value criteria and the sensed penetration value criteria for each character to be identified; and utilizing the style value and penetration value signals to identify each character.

2. A method of electronically recognizing characters, the method comprising:
   defining a scanning area of sufficient size to include the required identifying characteristics for all of the characters to be identified;
   scanning the scanning area at a plurality of spaced sensing positions to identify a scanning pattern covering said area;
   producing electrical signals indicative of the light reflective characteristics sensed at each of said sensing positions;
   counting the number of light transitions sensed from said scanning operation, and deriving signals indicative of the number of light transitions counted to provide style value identifying signals for the character to be identified;
   sensing the distance from a predetermined reference location to portions of the character disposed closest to said reference location;
   deriving signals indicative of the sensed distance to produce penetration value identifying criteria for the character to be identified; and
   deriving a character identifying signal from said style value signal and said penetration value signals.

3. A method of identifying characters comprising:
   providing first electrical signals indicative of predetermined identifying characteristics for a set of known characters;
   deriving a second electrical signal indicative of the identifying characteristics of a character to be identified;
   averaging the first electrical signals indicative of identifying characteristic values of a selected group of known characters;
   comparing the second electrical signal with the average value of the first electrical signals of the selected group of known characters;
   choosing the known characters of the group which have the same relationship to the average value as the unknown character has to the average value;
   proceeding with the comparison of the unknown between the chosen character and each of the remaining characters of the set of known characters to ultimately produce the identification of the unknown character as being more closely related to one of the known characters of the set than to any of the others.

4. A method of identifying characters comprising:
providing a plurality of first electrical signals indicative of predetermined identifying characteristics of the characters to be identified;
examining characters to be identified;
deriving second electrical signals representative of the desired identifying characteristics of the characters to be identified;
averaging the first electrical signals of a first selected group of known characters;
comparing the second electrical signal of a character to be identified with the average of the first electrical signals of the first selected group;
choosing a group of known characters from the first selected group which has the same relationship to the average of the first electrical signal of the first selected group as the character to be identified;
averaging the first electrical signals of a second selected group of known characters, the second selected group including the chosen group;
comparing the derived second electrical signal of the character to be identified with the average of the first electrical signals of the second selected group;
choosing a group from the second selected group which has the same relationship to the average of the first electrical signals of the second selected group as the character to be identified; and
repeating the averaging, comparing and choosing steps for the remaining characters of the set of known characters to ultimately produce a decision by process of elimination that the identifying characteristics of the character to be identified most closely resemble the identifying characteristics of one of the unknown characters.

5. The method of claim 4 wherein each selected group of known characters constitutes of pair of characters.

6. The method set forth in claim 4 wherein second electrical signals representative of the desired identifying characteristics of the character to be identified comprises:
scanning a predetermined area which includes at least the identifying portions of the character to be identified;
sensing the number of light transitions produced by each scanning path along a line of the scanning path to produce a plurality of style values;
deriving density measuring characteristic values for the areas of selected light transitions;
locating the center of density of each of the selected areas;
determining the penetration values to each center of density measured from each of the sides of the predetermined area;
determining the contour values from each scanning path; and
comparing the respective identifying characteristic values for the style, penetration, and contour values for each of the comparing steps.

7. A character recognition system comprising:
scanning means for scanning characters and producing electrical scan output signals in response to the characters;
means for producing style value signals for each character scanned, the style value signals being indicative of the largest number of scan output signal producing transitions from any particular line of scan of a plurality of lines of scan;
means for producing penetration value signals for each character scanned, the penetration value signals being indicative of the distance from a predetermined reference location to signal producing portions of the character disposed closest to said reference location;
storage means for storing style value signals and penetration value signals for a plurality of known characters; and
comparing means for comparing the style value and penetration value signals from the scanned characters with the stored style value and penetration value signals.

8. The character recognition system of claim 7 and further comprising:
utilization means having an output of the comparing means connected thereto.

9. The character recognition system of claim 7 and further comprising:
means for producing contour value signals for each character scanned, and wherein the storage means also stores contour value signals for the plurality of known characters and wherein the comparing means also compares the contour value signals for the scanned characters with the stored contour value signals.

10. The character recognition system of claim 9 wherein the penetration value signals comprise, north, south, east and west accumulated penetration value signals.

11. The character recognition system of claim 10 wherein the style value signals comprise horizontal and vertical style value signals.

12. The character recognition system of claim 11 wherein the contour value signals comprise north, south, east and west contour value signals.

13. A character recognition system comprising:
scanning means for scanning characters;
means for producing contour value signals for each character scanned, the contour value signals being indicative of the number of sign changes in the slope of the character;
means for producing penetration value signals for each character scanned, the penetration value signal being indicative of the distance from a predetermined reference location to signal producing portions of the character located closest to said reference location;
storage means for storing contour value signals and penetration value signals for a plurality of known character; and
comparing means for comparing the contour value and penetration value signals for the scanned characters with the stored contour value and penetration value signals.

14. The character recognition system of claim 13 wherein the penetration value signals comprise north, south, east and west accumulated penetration value signals.

15. The character recognition system of claim 13 wherein the contour value signals comprise north, south, east and west contour value signals.

16. A character recognition system comprising:

scanning means for scanning characters and producing electrical scan output signals in response to the characters;

means for producing style value signals for each character scanned, the style value signals being indicative of the largest number of scan output signal producing transitions from any particular line of scan of a plurality of lines of scan;

means for producing contour value signals for each character scanned, the contour value signals being indicative of the number of sign changes in the slope of the character;

storage means for storing style value signals and contour value signals for a plurality of known characters; and comparing means for comparing the style value and contour value signals for the scanned characters with the stored style value and contour value signals.

17. The character recognition system of claim 16 wherein the style value signals comprise horizontal and vertical style value signals.

18. The character recognition system of claim 16 wherein the contour value signals comprise north, south, east and west contour value signals.

19. A character recognition system comprising:
scanning means for scanning characters;
means for producing penetration value signals for each line of scan of a character scanned, the penetration value signals being indicative of the distance from a predetermined reference position to signal producing portions of the character on the line of scan which are disposed closest to said reference location;
accumulator means for accumulating the penetration value signals for a plurality of lines of scan and producing an accumulated penetration value signal;
normalized means for normalizing the accumulated penetration value signal to compensate for displacement of characters, the normalizer means producing a normalized accumulated penetration value signal;
storage means for storing accumulated penetration value signals for a plurality of known characters; and
comparing means for comparing the normalized accumulated penetration value signals.

20. A character recognition system comprising:
means for scanning a predetermined area which includes at least the identifying portions of a character to be identified;
means for locating a center of density of the predetermined area;
means for determining the penetration values to the center of density from each side of the predetermined area; and
means for comparing the penetration values to stored penetration values of known characters.

21. A character recognition system comprising:
scanning means for scanning characters;
character image register means for storing representations of a plurality of individual scanning positions of a character scanned by the scanning means;
means for producing style value signals for each character scanned;
means for producing penetration value signals for each character scanned comprising:

character segment detector means for producing signals indicating scanning positions at which input material is present;
character line total means for receiving signals from the character segment detector means for producing a signal indicative of the number of scanning positions from a predetermined position to a transition point at which input material is encountered;
character segment total means for producing a signal indicative of the sum of the representation stored in the character image register means for the scanning positions prior to the transition point; and
means for deriving penetration value signals from the signals from the character line total means and the character segment total means;
storage means for storing style value signals and penetration value signals for a plurality of known character; and
comparing means for comparing the style value and penetration value signals for the scan characters with the stored style value and penetration value signals.

22. The character recognition system of claim 21 wherein the means for producing penetration value signals further comprises:
accumulator means for accumulating the penetration value signals for a plurality of lines of scanning positions and producing an accumulated penetration value signal.

23. The character recognition system of claim 22 wherein the means for producing penetration value signals further comprises:
normalizer means for normalizing the accumulated penetration value signal to compensate for displacement of characters, the normalizer means producing a normalized accumulated penetration value signal.

24. The character recognition system of claim 23 wherein the comparing means compares the normalized accumulated penetration value signal with stored accumulated penetration value signals.

25. The character recognition system of claim 21 wherein the means for deriving penetration value signals comprises:
multiplier means for multiplying the signal from the character line total means by a constant; and
adder means for subtracting the signal from the character segment total means from twice the multiplied signal from the character line total means to produce the penetration value signal.

26. The character recognition system of claim 21 wherein the means for producing style value signals comprises:
style value circuit means for deriving style value signals from the signals produced by the character line total means.

27. The character recognition system of claim 26 and further comprising:
contour value circuit means for deriving contour value signals from penetration value signals for a plurality of lines of scanning positions.

28. The character recognition system of claim 27 wherein the storage means also stores contour value signals for the plurality of known characters and wherein the comparing means also compares the contour value signals for the scanned characters with the stored contour value signals.

29. The character recognition system of claim 28 wherein the means for producing penetration value signals further comprises:
accumulator means for accumulating the penetration value signals for a plurality of lines of scanning positions and producing an an accumulated penetration value signal; and
normalizer means for normalizing the accumulated penetration value signal to compensate for displacement of characters, the normalizer means producing a normalized accumulated penetration value signal.

30. The character recognition system of claim 29 wherein the comparing means comprises:
penetration value comparing means for comparing normalized accumulated penetration value signals with stored accumulated penetration value signals;
style value comparing means for comparing style value signals from a scanned character with stored style value signals;
contour value comparing means for comparing contour value signals from a scanned character with stored contour value signals; and
judgment circuit means for determining the identity of a character scanned based upon the comparisons by the penetration value comparing means, the style value comparing means, and the contour value comparing means.

31. The character recognition system of claim 30 wherein the accumulated penetration value signals comprise north, south, east and west accumulated penetration value signals; wherein the style value signals comprise horizontal and vertical style value signals; and wherein the contour value signals comprise north, south, east and west contour value signals.

32. The character recognition system of claim 31 wherein the judgment circuit means identifies a scanned character if at least one of the normalized accumulated penetration value signals is similar to a stored accumulated penetration value signal of the known character and all of the style and contour value signals of the scanned character are similar to stored style value and contour value signals of the known character.

* * * * *